(12) United States Patent
Braunecker et al.

(10) Patent No.: US 8,021,454 B2
(45) Date of Patent: Sep. 20, 2011

(54) DISPOSABLE AIR FILTER SUB-ASSEMBLY

(75) Inventors: Laura Braunecker, Cumming, GA (US); Alice Gordon, Roswell, GA (US); Ward Elwood, Jr., Roswell, GA (US); Timothy J. Peters, Neenah, WI (US); Anthony N. Fedel, Alpharetta, GA (US); George I. Nukuto, Neenah, WI (US)

(73) Assignee: Kimberly-Clark Worldwide, Inc, Neenah, WI (US)

( * ) Notice: Subject to any disclaimer, the term of this patent is extended or adjusted under 35 U.S.C. 154(b) by 385 days.

(21) Appl. No.: 12/215,461

(22) Filed: Jun. 27, 2008

(65) Prior Publication Data
US 2009/0320426 A1 Dec. 31, 2009

(51) Int. Cl.
*B01D 46/00* (2006.01)

(52) U.S. Cl. ............. 55/483; 55/484; 55/502; 55/511; 55/DIG. 31

(58) Field of Classification Search .......... 55/482, 55/483, 484, 502, 511, DIG. 31
See application file for complete search history.

(56) References Cited

U.S. PATENT DOCUMENTS

| | | |
|---|---|---|
| 2,019,213 A | 10/1935 | Dahlman |
| 2,252,724 A | 8/1941 | Myers |
| 3,423,908 A | 1/1969 | Hart |
| 3,862,903 A | 1/1975 | Getzin |
| 3,884,662 A | 5/1975 | Hladik |
| 4,009,012 A * | 2/1977 | Heffler ................ 55/483 |
| 4,128,251 A | 12/1978 | Gaither et al. |
| 4,233,044 A * | 11/1980 | Allan ................ 55/355 |
| 4,584,005 A | 4/1986 | Allan et al. |
| 4,639,261 A * | 1/1987 | Pittman et al. ........... 55/502 |
| 4,854,953 A | 8/1989 | VanWeerden et al. |
| 4,925,468 A * | 5/1990 | Kishi et al. .............. 55/467 |
| 5,059,218 A | 10/1991 | Pick |
| 5,240,487 A | 8/1993 | Kung |
| 5,298,044 A | 3/1994 | Sutton et al. |
| 5,332,409 A | 7/1994 | Dralle |
| 5,525,136 A | 6/1996 | Rosen |
| 5,618,324 A | 4/1997 | Sommer et al. |
| 5,795,361 A | 8/1998 | Lanier, Jr. et al. |
| 5,797,975 A | 8/1998 | Davis |
| 5,837,022 A | 11/1998 | Chapman |
| 5,858,515 A | 1/1999 | Stokes et al. |
| 5,931,988 A | 8/1999 | LeBlanc et al. |
| 5,993,520 A | 11/1999 | Yu |
| 6,007,596 A | 12/1999 | Rosen |
| 6,027,553 A | 2/2000 | Hirano et al. |
| 6,099,612 A | 8/2000 | Bartos |

(Continued)

FOREIGN PATENT DOCUMENTS

EP 1504803 A1 2/2005

(Continued)

*Primary Examiner* — Robert A Clemente
(74) *Attorney, Agent, or Firm* — Ralph H. Dean, Jr.

(57) ABSTRACT

A disposable air filter sub-assembly that includes: (a) air filtration media; (b) a substantially planar air filter frame providing three-dimensional support for the air filtration media; and (c) an air filter frame-connecting means integrated into the air filter frame. The integrated air filter frame-connecting means are adapted to connect a plurality of identical air filter sub-assemblies into an air filter assembly with sufficient structural strength in at least one direction such that the air filter sub-assemblies resists separation when the air filter assembly is extracted from the filter track of a filter bank.

27 Claims, 20 Drawing Sheets

U.S. PATENT DOCUMENTS

| | | |
|---|---|---|
| 6,149,701 A | 11/2000 | Ellingson |
| 6,174,340 B1 | 1/2001 | Hodge |
| 6,241,603 B1 | 6/2001 | Watson |
| 6,267,793 B1 | 7/2001 | Gomez et al. |
| 6,274,041 B1 | 8/2001 | Williamson et al. |
| 6,322,604 B1 | 11/2001 | Midkiff |
| 6,361,578 B1 | 3/2002 | Rubinson |
| 6,425,945 B1 | 7/2002 | Cheng |
| 6,451,079 B1 | 9/2002 | Lange et al. |
| 6,485,538 B1 | 11/2002 | Toyoshima |
| 6,508,851 B2 | 1/2003 | Goerg |
| 6,579,336 B1 | 6/2003 | Duffy et al. |
| 6,624,100 B1 | 9/2003 | Pike |
| 6,716,267 B2 | 4/2004 | Lawlor, Sr. |
| 6,780,217 B1 | 8/2004 | Palmer |
| 6,793,715 B1 | 9/2004 | Sandberg |
| 6,815,383 B1 | 11/2004 | Arnold |
| 6,916,352 B2 | 7/2005 | Sutton et al. |
| 6,941,630 B2 | 9/2005 | Wynn |
| 7,041,147 B2 | 5/2006 | Huehn et al. |
| 7,128,771 B2 | 10/2006 | Harden |
| 7,261,757 B2 | 8/2007 | Duffy |
| 7,320,720 B2 * | 1/2008 | Ticknor ............... 55/483 |
| 7,410,520 B2 * | 8/2008 | Nowak et al. ........... 55/482 |
| 7,419,524 B2 * | 9/2008 | Caesar et al. ............ 55/482 |
| 2003/0096548 A1 | 5/2003 | Groitzsch et al. |
| 2003/0230063 A1 | 12/2003 | Kubokawa et al. |
| 2003/0233818 A1 | 12/2003 | Hensley |
| 2004/0035767 A1 | 2/2004 | Pahl et al. |
| 2004/0074215 A1 | 4/2004 | Cocconi |
| 2004/0182055 A1 | 9/2004 | Wynn |
| 2005/0039427 A1 | 2/2005 | Karlsson |
| 2006/0096261 A1 | 5/2006 | Zhang |
| 2006/0168926 A1 | 8/2006 | Dawson et al. |
| 2006/0277879 A1 | 12/2006 | Knowles |
| 2007/0084167 A1 | 4/2007 | Ticknor |
| 2008/0105126 A1 * | 5/2008 | Kawano et al. ............ 96/11 |
| 2008/0148698 A1 | 6/2008 | Nowak et al. |

FOREIGN PATENT DOCUMENTS

| | | |
|---|---|---|
| EP | 1527806 A1 | 5/2005 |
| GB | 1070149 A | 5/1967 |
| GB | 1115422 A | 5/1968 |
| GB | 1490019 A | 10/1977 |
| JP | 57-070416 U | 4/1982 |
| JP | 59-086227 U | 6/1984 |
| JP | 61-183116 U | 11/1986 |
| JP | 05-026127 U | 4/1993 |
| JP | 7-31817 A | 2/1995 |
| JP | 11-047526 A | 2/1999 |
| JP | 11-304235 A | 11/1999 |
| JP | 2005-177641 A | 7/2005 |
| JP | 2008-119683 A | 5/2008 |
| WO | WO 2006/052094 | 5/2006 |

* cited by examiner

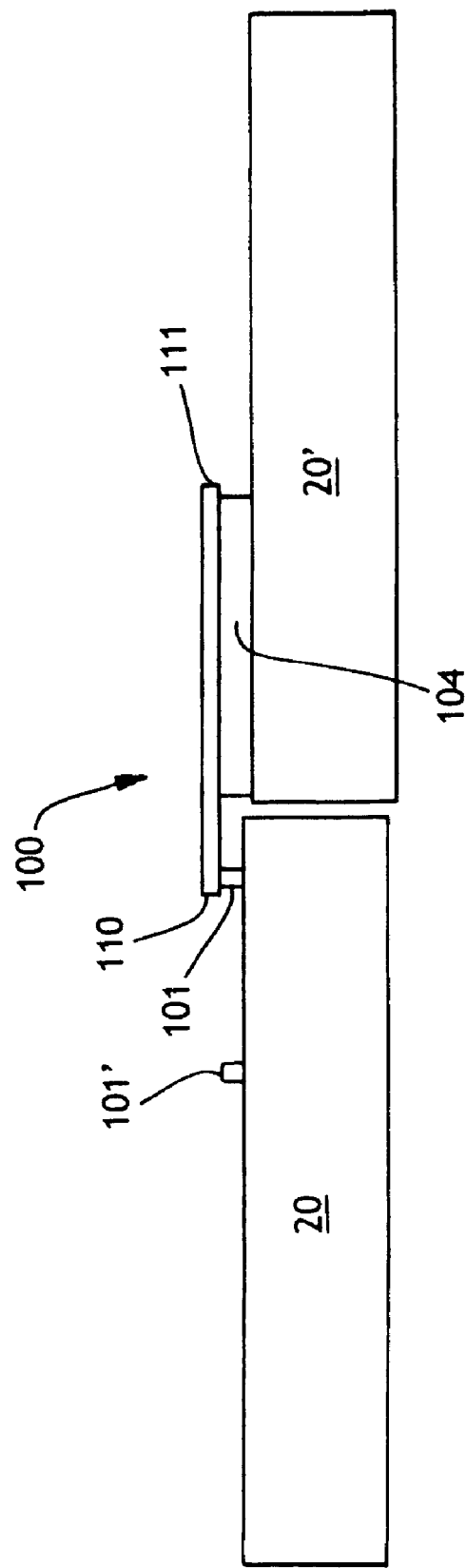

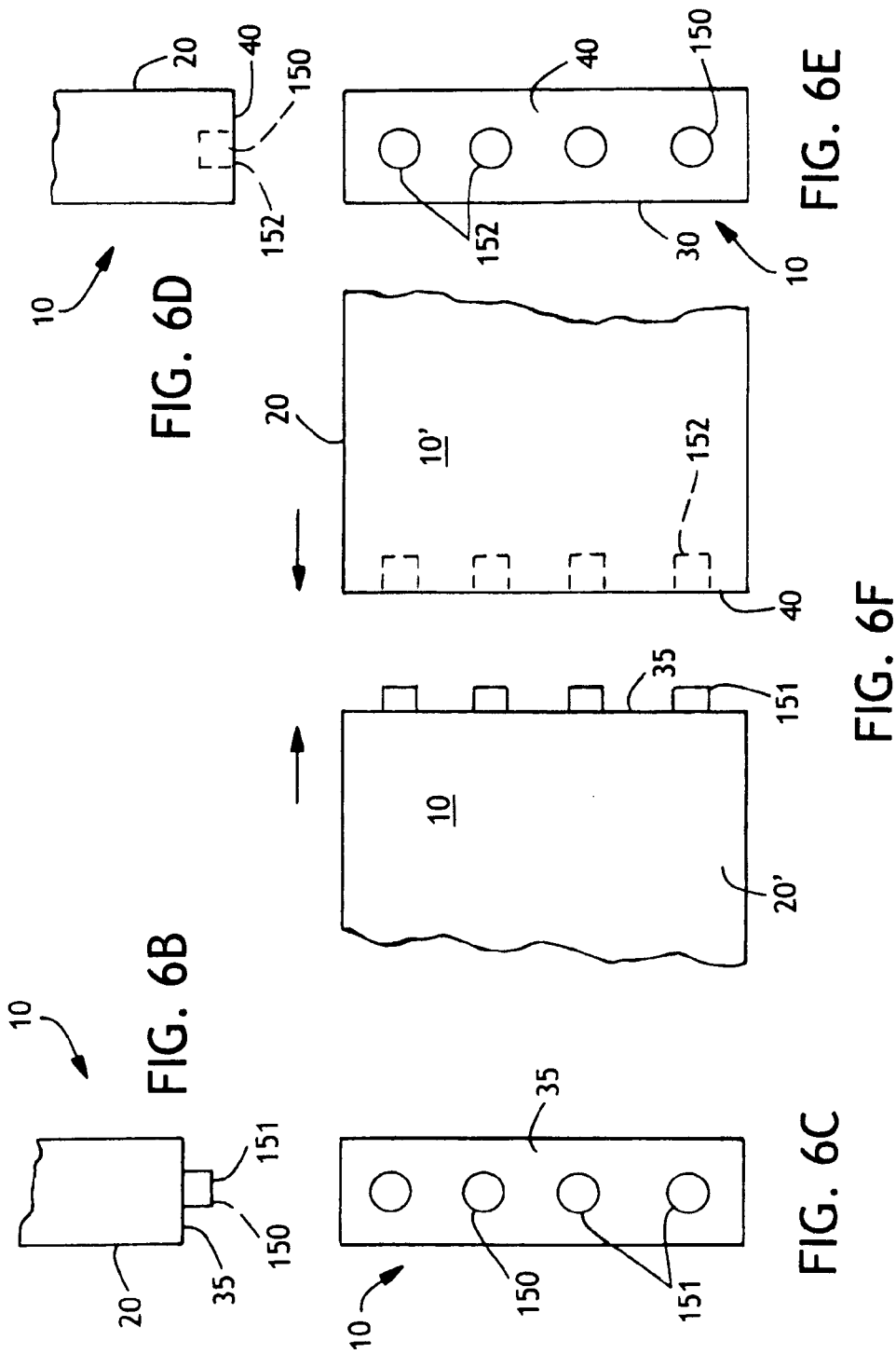

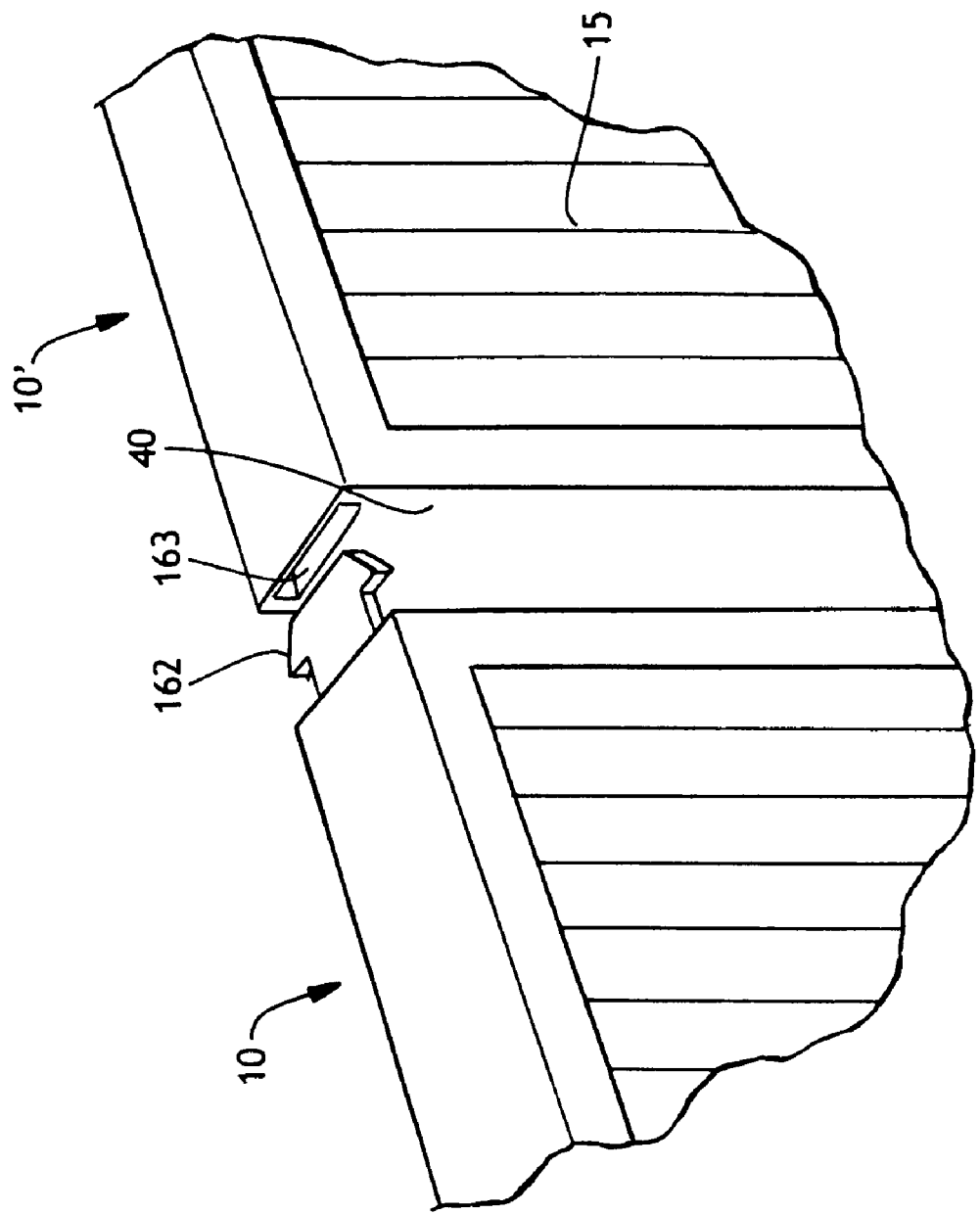

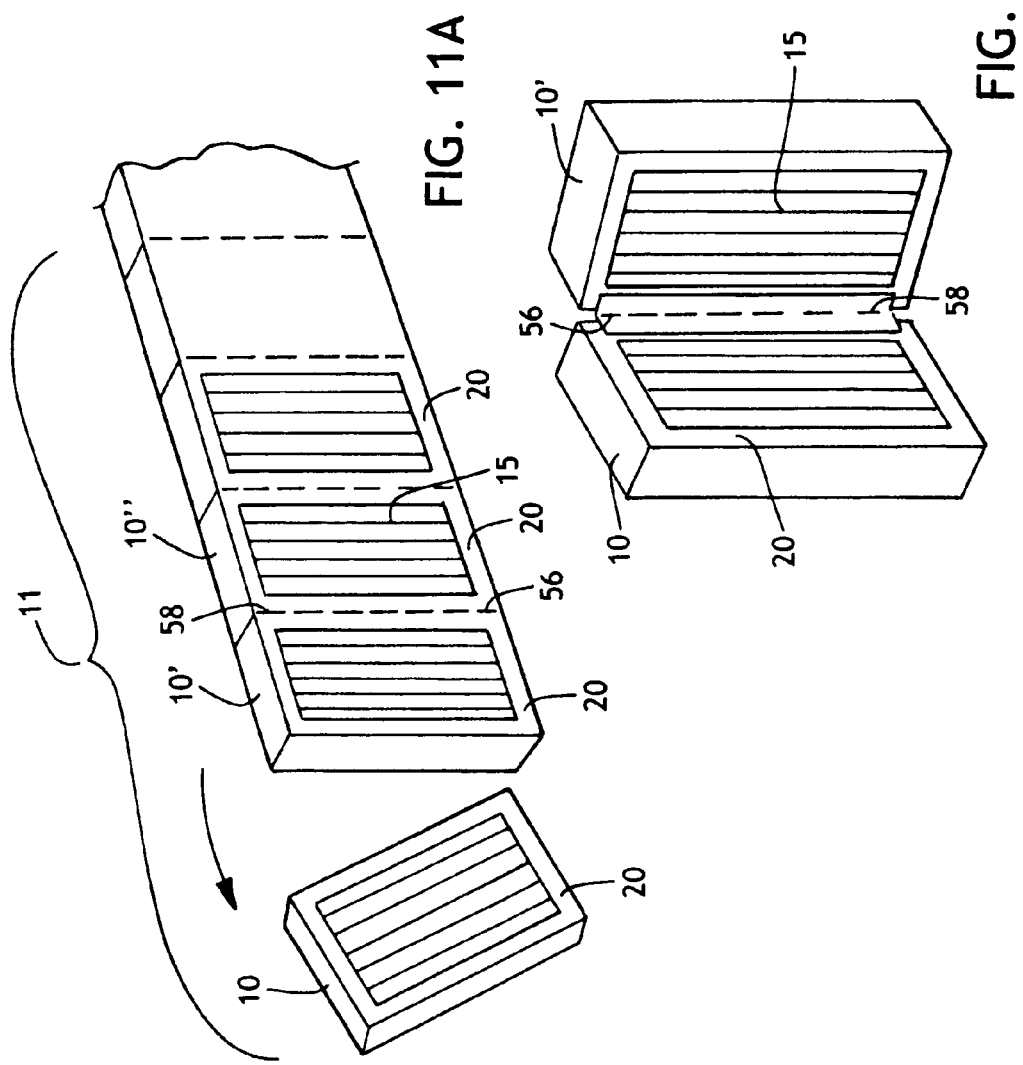

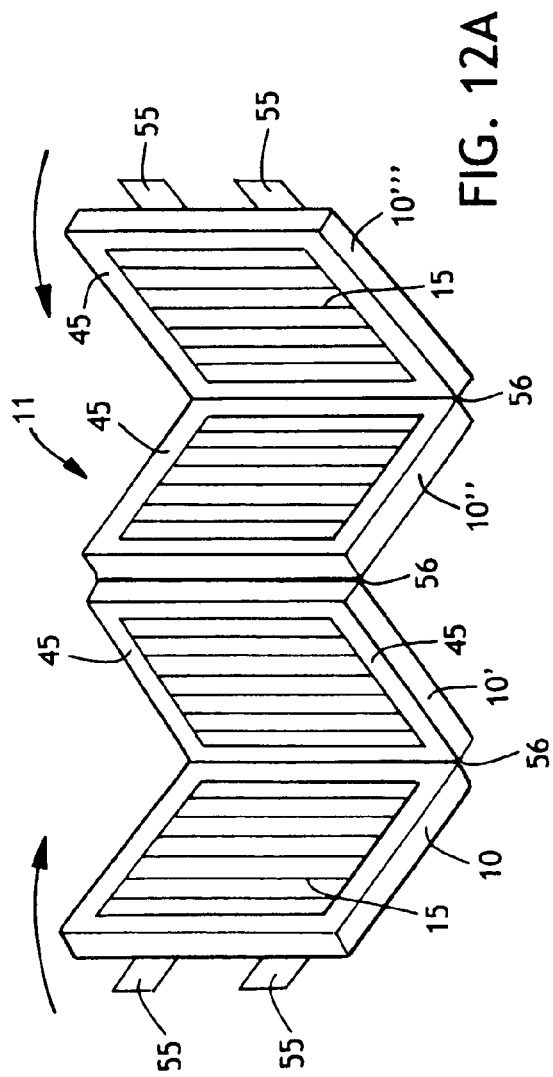
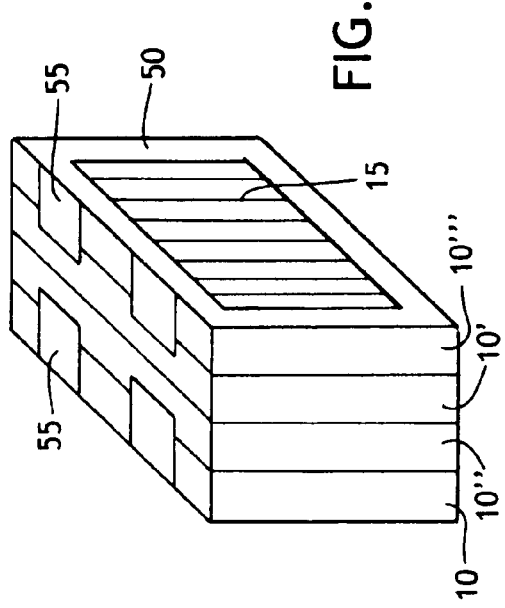

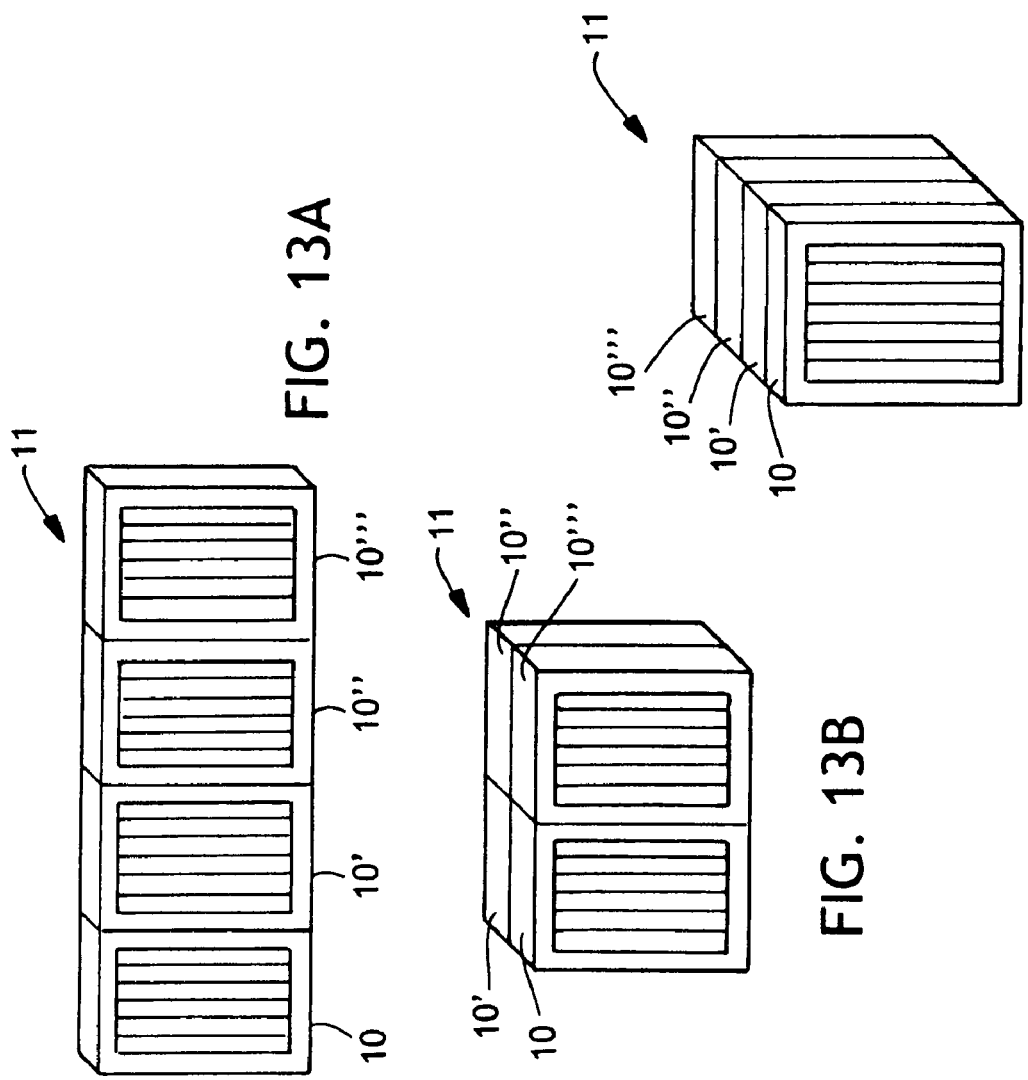

DISPOSABLE AIR FILTER SUB-ASSEMBLY

FIELD OF THE INVENTION

The present invention relates in general to air filters. In particular, the invention relates to air filters used in applications where multiple adjacent air filters are arranged in a filter bank or array.

BACKGROUND OF THE INVENTION

Air filters are generally known in the art and are employed in a variety of applications including heating and ventilation systems. A typical air filter is composed of a filtering material; often paper, a nonwoven material or foam, and a frame or housing that supports the filtering material. Conventional air filters are typically designed to remove particulate matter from the air.

In some applications, particularly those related to commercial and industrial operations, the ventilation ducts may be quite large. Typically, several air filters are used in a filter bank. These filters may be installed into individual cells of an array or frame for holding individual filters or may slide into a rack that is adapted to hold a row of air filters in a side-by-side arrangement. Thus, an array of air filters arranged adjacent to one another is typically employed as a filter bank.

In an arrangement of air filters where the air filters are installed by sliding the air filters into a rack that is adapted to hold a row of filters in a filter bank, the air filters are often difficult to remove when it becomes necessary to change the air filters. This difficulty may be further increased in larger air handling systems having multiple large rows of filters in a filter bank. This is because a conventional side-by-side arrangement of air filters in a filter bank requires retrieval on a one-by-one basis. The air filters located farthest from the access point are frequently retrieved with a hook, wire or specialized devices constructed by maintenance personnel. This process is often very difficult and very time consuming. In addition, the handling and disposal of individual filters with caked with dust presents further problems both inside the air handling equipment and in the utility rooms where the air handling equipment is located. The difficulty in removing the air filters may result in the dust and debris caked onto the filter being accidentally dislodged from the air filter and into the air ducts or air handling equipment.

Moreover, the conventional side-by-side arrangement of air filters in a filter bank often results in a small gap or space between adjacent filters. As a result, a portion of air flow may avoid being filtered by the filter bank, bypassing the air filters (known as air bypass), and prior to being circulated throughout the building. This may result in detrimental effects of unfiltered air flowing through a ventilation system, including adverse effects on individuals. In addition to these effects on individuals, unfiltered air flow may also induce mechanical problems within the ventilation system itself, which may result in improper heating and cooling operations within a building structure. Dust particles may be deposited on the heating and cooling coils, clogging the coils and impeding proper operation of the ventilation system. Cleaning such coils is both time consuming and expensive.

One solution to the problem of air bypass is described in U.S. Pat. No. 6,916,352 to Sutton et al. and relates to the use of "I" shaped connectors to join adjacent filters in a filter bank. The connectors are used to join individual filters in side-by-side relationship as they are inserted into a track or opening in a filter bank. Sides of adjoining filter panels are inserted into the opposed channels of the "I"-shaped connectors. The "I"-shaped connector fills the gap between the sides of the adjacent filters to reduce air bypass between the sides of adjacent filters. The disadvantage with this design is the need for separate, non-integral connector pieces that must be joined to each filter upon installation.

Because the connector piece is inserted separately from the air filter, such an air filter installation process would disadvantageously be more time-consuming and cumbersome than that of installing filters alone. There is also the risk that an installer may inadvertently drop a connector piece into the filter bank and be forced to extract and reposition it, prolonging the installation process. In addition, installation may be dependent upon having an adequate supply of both connector pieces and air filters on site, possibly requiring installers to transport an increased volume of materials and supplies to installation sites.

While these connectors are described as reducing air bypass, the connectors are not described as securely attaching adjacent air filter together for efficient removal of the filters. Moreover, unless the individual connector pieces are disposable, they each must be removed from each filter upon extraction of the filters from the filter bank. This separation operation can be time consuming and can generate handling and disposal problems both within the air handling equipment and in the utility rooms where the air handling equipment is located.

Therefore, it is readily apparent that there is a need for an air filter that addresses these problems.

BRIEF SUMMARY OF THE INVENTION

The problems described above are addressed by the present invention which encompasses a disposable air filter sub-assembly that can be assembled into an air filter assembly. The disposable air filter sub-assembly includes: (a) air filtration media; (b) an air filter frame which is substantially planar and provides three-dimensional support for the air filtration media; and (c) an air filter frame-connecting means integrated into the air filter frame. According to the invention, the air filter frame-connecting means is adapted to connect a plurality of air filter sub-assemblies into an air filter assembly with sufficient structural strength in at least one direction such that the air filter sub-assemblies resists separation when the air filter assembly is extracted from a filter track of a filter bank. That is, the present invention allows the formation of a train of air filter sub-assemblies that can be pulled in one-piece from the filter track of the filter bank.

In one embodiment of the present invention, the air filter frame-connecting means may be one or more connecting elements of the following: integrated fold-over adhesive tabs, integrated fold-over mechanical tabs, integrated nesting connection devices, integrated snap connectors, integrated hook and loop fasteners, integrated magnetic connectors, and integrated slot-tab connectors.

In an aspect of the invention, the air filter frame-connecting means may form a pivotal connection between the air filter sub-assemblies. This pivotal connection between multiple air filter sub-assemblies may include alternating pivotal connections.

According to the invention, the air filter frame has an opposed pair of first sides, an opposed pair of second sides, two opposed faces, and a width between the opposed faces. Based on such a configuration, the air filter frame-connecting means are integrated with the air filter frame and can be disposed along at least a portion of the opposed first sides and/or opposed second sides, or it may be disposed along the entirety of the opposed first sides and/or opposed second sides. In a further embodiment, the air filter frame-connecting means may include a frangible portion. This frangible portion can be used to separate individual filter sub-assemblies upon extraction of the filter from the filter bank.

The air filtration media may be conventional air filtration material including paper, nonwoven fabrics, fiberglass and foams. Although paper filters and mixed media filter materials are frequently used, one desirable air filtration media is a non-woven fibrous material or laminate material.

In one embodiment of the present invention, the disposable air filter sub-assembly may further include an expandable gap filling structure, which is typically positioned at the end of the air filter sub-assembly chain. Generally speaking, this expandable gap filling structure may have dimensions generally the same as either the first opposed sides or the second opposed sides of an air filter frame. The expandable gap filling structure will include air frame-connecting means along at least a portion of a side so that the air frame-connecting means can connect the expandable gap filling structure to a plurality of air filter sub-assemblies. This connection should have sufficient structural strength in at least one direction so that the connection resists separation upon extraction of the air filter assembly from the filter track of a filter bank. The expandable gap filling sub-assembly may be an accordion folded or pleated material, a series of foam pieces or other construction adapted to block passage of air while having dimensions generally the same as either the first opposed sides or the second opposed sides of an air filter frame.

The present invention also encompasses an air filter system composed of at least two disposable air filter sub-assemblies (i.e., a plurality of disposable air filter sub-assemblies) as generally described above. More particular, the air filter system utilizes the air filter frame sub-assemblies having the air filter frame-connecting means integrated with the air filter frame. This connecting means may be adapted to form a pivotal connection between air filter sub-assemblies and, in some embodiments; the pivotal connections may be alternating pivotal connections. The pivotal connection can be configured so that an air-flow facing face of each air filter sub-assembly in an air filter assembly can be pivoted into a closed, face-to-face relationship upon extraction of the air filter assembly from the filter track of a filter bank. Such an arrangement will capture or enclose the dust cake collecting on the air-flow facing side of the air filter sub-assembly.

The air filter system may further include an expandable gap filling sub-assembly as generally described above. This expandable gap filling sub-assembly may be an accordion folded or pleated material, a series of foam pieces or other construction adapted to block passage of air while having dimensions generally the same as either the first opposed sides or the second opposed sides of an air filter frame.

In an embodiment of the present invention, the disposable air filter sub-assembly may be composed of two air filter frames and associated media with a hinge pivotally connecting the two air filter frames. More particularly, the disposable air filter sub-assembly includes: (a) a first air filtration media; (b) a first substantially planar air filter frame providing three-dimensional support for the first air filtration media; (c) a second air filtration media; (d) a second substantially planar air filter frame providing three-dimensional support for the first air filtration media; (e) a hinge pivotally connecting the first air filter frame with the second air filter frame at a first side or second side of the respective filter frames; and (e air filter frame-connecting means integrated into the air filter frame on either: (i) the remaining non-connected first side or second side of the respective filter frames that are generally parallel with the hinge; or (ii) on the opposed pair of first sides or the opposed pair of second sides that are generally perpendicular to the hinge.

According to the invention, the integrated air filter frame-connecting means are adapted to connect a plurality of air filter sub-assemblies into an air filter assembly with sufficient structural strength in at least one direction such that the air filter sub-assemblies resists separation when the air filter assembly is extracted from the filter track of a filter bank. That is, the present invention allows the formation of a train of air filter sub-assemblies that can be pulled in one-piece from the filter track of a filter bank.

According to the invention, a third air filter frame and associated media (or more) may be added to the disposable air filter sub-assembly with a hinge pivotally connecting the additional air filter frames. Desirably, the hinge connections are configured as alternating pivotal connections so the sub-assembly is able to pivot to create an accordion fold so that air flow facing faces of the sub-assemblies can be joined together to trap or contain collected dust caked on the filter face.

In an aspect of the invention, the integrated air filter frame-connecting means that joins the plurality of air filter sub-assemblies desirably includes a frangible portion so that the individual air filter sub-assemblies may be separated either during installation or for disposal.

The present invention further includes a method of preparing an air-filter assembly for removal utilizing any of the air filter sub-assemblies described above. Generally speaking, the method includes the following steps: (a) providing a first air filter sub-assembly; (b) providing a second identical air filter sub-assembly; and (c) connecting the first air filter sub-assembly and the second air filter sub-assembly utilizing the integrated air filter frame-connecting means during insertion into a filter bank of an air handling system.

The method may include the following additional steps: providing at least a third identical air filter sub-assembly; and connecting the third air filter sub-assembly and the second air filter sub-assembly utilizing the integrated air filter frame-connecting means during insertion into a filter bank of an air handling system.

According to the method of the present invention, the integrated air filter frame-connecting means connect the air filter sub-assemblies into an air filter assembly having sufficient structural strength in at least one direction so that the air filter sub-assemblies resists separation upon extraction of the air filter assembly from the filter track of a filter bank.

The method of the present invention may also include the following steps: providing an expandable gap filling sub-assembly having dimensions generally the same as either the first opposed sides or the second opposed sides of an air filter frame, and including integrated connecting means disposed along at least a portion of a side; and connecting the expandable gap filling sub-assembly to a plurality of identical air filter sub-assemblies utilizing the integrated connecting means during insertion into a filter bank of an air handling system. According to the method of the present invention, the gap filling sub-assembly is connected with sufficient structural strength in at least one direction so that the connection resists separation upon extraction of the air filter assembly from the filter track of a filter bank.

These and other features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Invention with reference to the accompanying drawing figures, in which like reference numerals denote similar structure and refer to like elements throughout, and in which:

FIGS. 2A through 2D are illustrations of exemplary integrated fold-over adhesive tabs;

FIGS. 6A through 6G are illustrations of exemplary integrated snap connectors in the form of integrated friction fit connectors;

FIGS. 7A and 7B are illustration of an exemplary integrated slot-tab connector;

FIGS. 11A and 11B are illustrations of an aspect of the exemplary hinges relating to exemplary frangible portions of such hinges;

FIGS. 12A and 12B are illustrations of an exemplary pivotal hinge connection between multiple air filter frames in a single air filter sub-assembly and an exemplary advantage provided by such a pivotal hinge connection; and FIGS. 13A through 13C are illustrations of exemplary air filter sub-assembly configurations enabled by an exemplary pivotal hinge connection containing frangible portions.

DEFINITIONS

Figure 1:
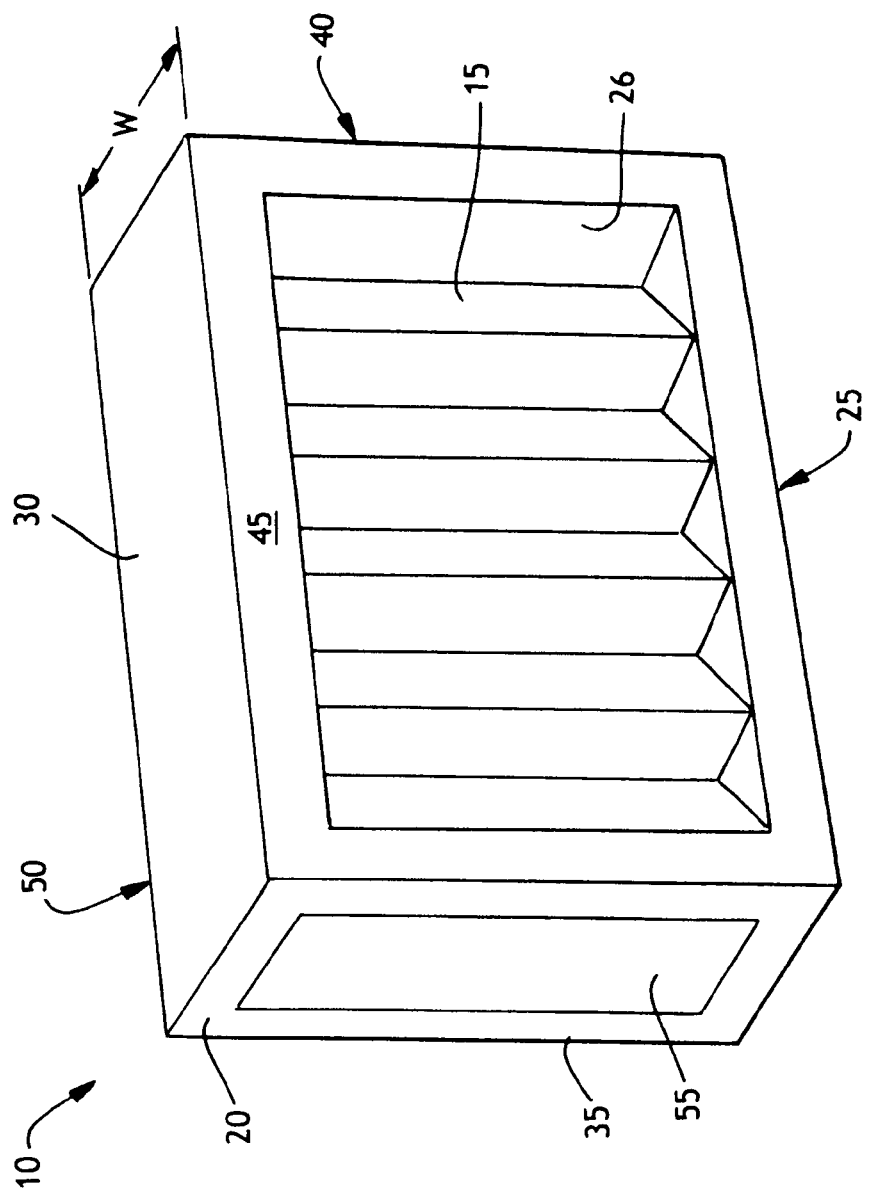
FIG. 1 is an illustration of an exemplary air filter sub-assembly.

It should be noted that, when employed in the present disclosure, the terms "comprises", "comprising" and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

It should be understood that the terms "left", "right", "top", "bottom", "front" and "back" are all intended to be relative terms and are for reference in the drawings only. These terms are used for the purposes of understanding the present invention and are not intended by be limiting in any way.

DETAILED DESCRIPTION OF INVENTION

In describing the preferred and alternate embodiments of the present invention, as illustrated in the figures and/or described herein, specific terminology is employed for the sake of clarity. The invention, however, is not intended to be limited to the specific terminology so selected, and it is to be understood that each specific element includes all technical equivalents that operate in a similar manner to accomplish similar functions.

Thus, exemplary embodiments of the invention are presented herein; however, the invention may be embodied in a variety of alternative forms, as will be apparent to those skilled in the art. To facilitate understanding of the invention, and provide a basis for the claims, various figures are included in the description. The figures are not drawn to scale and related elements may be omitted so as to emphasize the novel features of the invention. Structural and functional details depicted in the figures are provided for the purpose of teaching the practice of the invention to those skilled in the art and are not intended to be considered limitations. Directional terms such as left, right, front or rear are provided to assist in the understanding of the invention and are not intended to be considered as limitations.

Referring now to FIG. 1, the present invention encompasses a disposable air filter sub-assembly 10 that can be assembled into an air filter assembly. The disposable air filter sub-assembly 10 includes air filtration media 15 and a substantially planar air filter frame 20. The air filter frame 20 has an opposed pair of first sides 25 and 30, an opposed pair of second sides 35 and 40, two opposed faces 45 and 50, and a width "W" between the opposed faces. Generally speaking, the two opposed faces 45 and 50 are the front and back faces, respectively, the opposed second sides 35 and 40 are the left and right sides, respectively and the first opposed sides 25 and 30 are bottom and top, respectively, of air filter frame 30. The air filter frame 30 serves to provide three-dimensional support to the air filtration media 25. The air filtration media 25 is generally located between the front face 45 and back face 50 of the air filter frame 20. As shown, the front and back faces 45, 50 of the air filter frame 20 each have an opening 26 so that air coming into contact with the air filter 20 is allowed to pass through the front face 55, contact the air filtration media 15, pass through the filtration media 15 and the resulting filtered air is then passed through the opening in the back face 50. It is noted that the reference of the front face 45 and the back face 50 are only relative terms and this description is not intended to exclude having unfiltered air passing through the back face 50 and the filtered air being passed through the front face 45.

According to the invention, the air filter frame-connecting means 55 is integrated into the air filter frame and is adapted to connect a plurality of air filter sub-assemblies 10 into an air filter assembly. The air filter frame-connecting means should have sufficient structural strength in at least one direction such that the air filter sub-assemblies resist separation when the air filter assembly is extracted from the filter track of a filter bank. That is, the present invention allows the formation of a train of air filter sub-assemblies that can be pulled in one-piece from the filter track of a filter bank. The amount of structural strength may vary but it is generally thought that the integrated air filter frame-connecting components should provide a connection sufficient to withstand force that is normally applied to air frame assemblies during removal of filter assemblies from a filter bank. Generally, the structural strength should be in the range of about 20 to about 1000 grams, as measured by a tensile strength test. Generally the air filter frame-connecting components should provide a connection sufficient to withstand force that may be measured in the range of about 100 to about 500 grams. Typically, the air filter frame-connecting components should provide a connection sufficient to withstand force that may be measured in the range of about 200 to about 400 grams.

According to the invention, the air filter frame-connecting means may include connection components, connecting elements or connecting means which may be one or more of the following or combinations thereof. Examples of suitable air filter connecting means include integrated fold-over adhesive tabs, integrated fold-over mechanical tabs, nesting connecting devices, integrated snap connectors, integrated hook and look fasteners, magnetic connectors and integrated slot-tab connectors. Each of these connecting means will be described in more detail below.

Figure 2A:
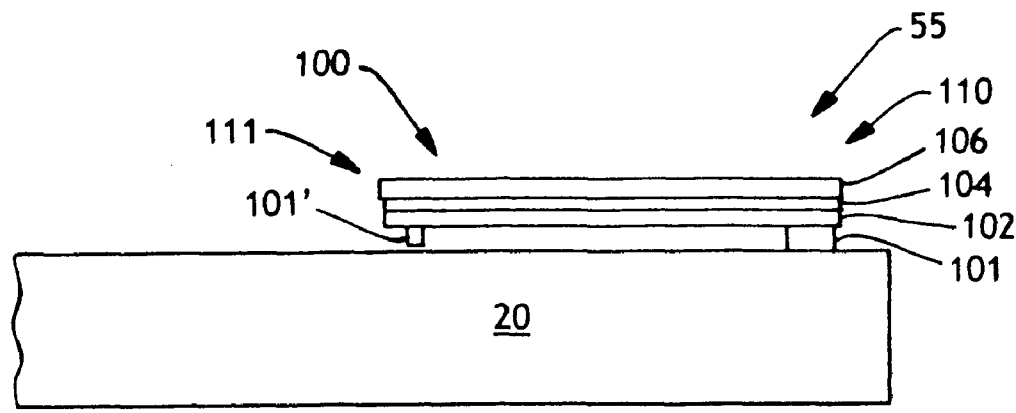
Figure 2B:
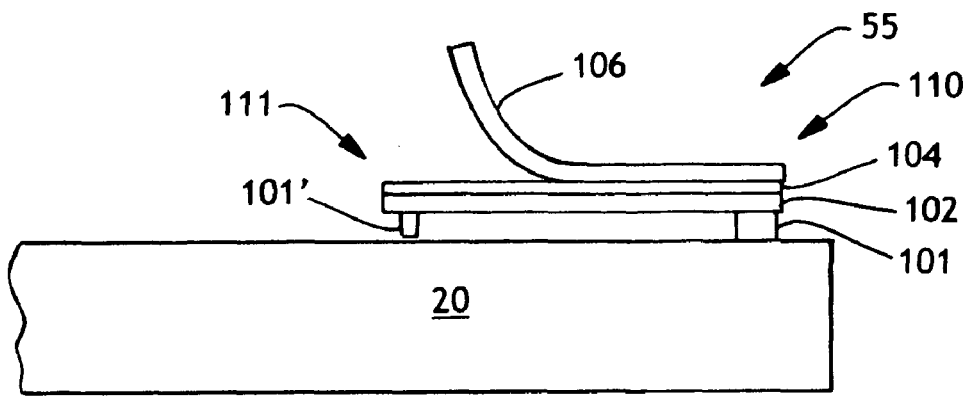
Figure 2C:
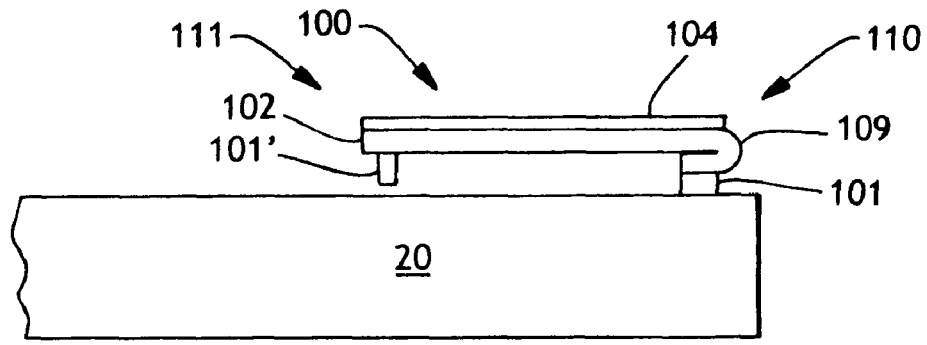

In one embodiment of the present invention, the air filter frame-connecting means 55 may be fold-over adhesive tabs 100, as is shown in FIG. 2A. FIG. 2A shows the fold-over adhesive tab 100 in position prior to use. The adhesive tabs 100 have a first end 110 and a second end 111. The fold-over adhesive tabs 100 are typically attached to the air filter frame 20 at the first end 110 of the adhesive tab, via an attachment means, such as an adhesive 101 as is shown in FIG. 2A, or another mechanical means that will retain the fold-over adhesive tab 100 attached to the air filter frame 20. Generally, the fold over adhesive tabs 100 will be composed of an adhesive 104 which is applied to a substrate 102. A removable release strip 106 is applied to the adhesive 104, to protect the adhesive 104 prior to use. In addition, an optional adhesive or other anchoring means 101' may be used to hold the adhesive tab 100 in place prior to use at or near the second end 111. This anchoring means 101' should be such that it will release the adhesive tab 100 from the air-filter frame 20. Generally, the anchoring means 101' will be set back away from the second end 111. The release strip 106 may be longer at either the first end 110, or the second end 111 to assist a user in removing the air release strip 106 from the adhesive 104 of the adhesive tab 100 to expose the adhesive 104. FIG. 2B shows the release strip 106 being removed from the adhesive tab 100 to expose the adhesive 104. Optionally, the substrate 102 has a fold 109 at the first end 110, as is shown in FIG. 2C. With the fold 109 being present on the adhesive tab, the adhesive tab 100 will lay flatter when adhered to an adjacent air filter frame 20'. Once the adhesive 104 is exposed, the adhesive tab 100 is folded over such that the adhesive 104 of the adhesive tab 100 comes into contact with a second air filter frame to effectively connect the first air filter frame 20 to a second air filter frame 20'. FIG. 2D shows the adhesive tab 100 connecting a first air filter frame 20 to a second air filter frame 20'.

Each air filter sub assembly may have two or more (e.g., a plurality of) integrated fold-over adhesive tabs as shown in FIGS. 2A to 2D. As is shown in FIG. 2D, the first end 110 remains attached to the first air filter frame 20 and the second end 111 is place on or attached to the second air filter frame 20'. Generally, the first end 110 of the tab 100 is connected to the near the edge of the air filter frame 20. The release strip 106 may be a release coated paper or a release coated film. A small tab of release strip, as is shown in FIG. 2A may be retained at the end for grasping by a user of the air filter sub assembly. Once folded over onto the second air filter frame, the adhesive tab 100 is secured to the second air frame by applying pressure to adhesive tab 100. Typically, the adhesive 106 will be a pressure sensitive adhesive. The substrate 102 of the adhesive tab 100 may be prepared from paper, a film, a woven web, a nonwoven web or a laminate of these materials. The adhesive tabs 100 should be positioned on the air frames such that the adhesive tabs do not interfere with the air filtration media.

Figure 3A:
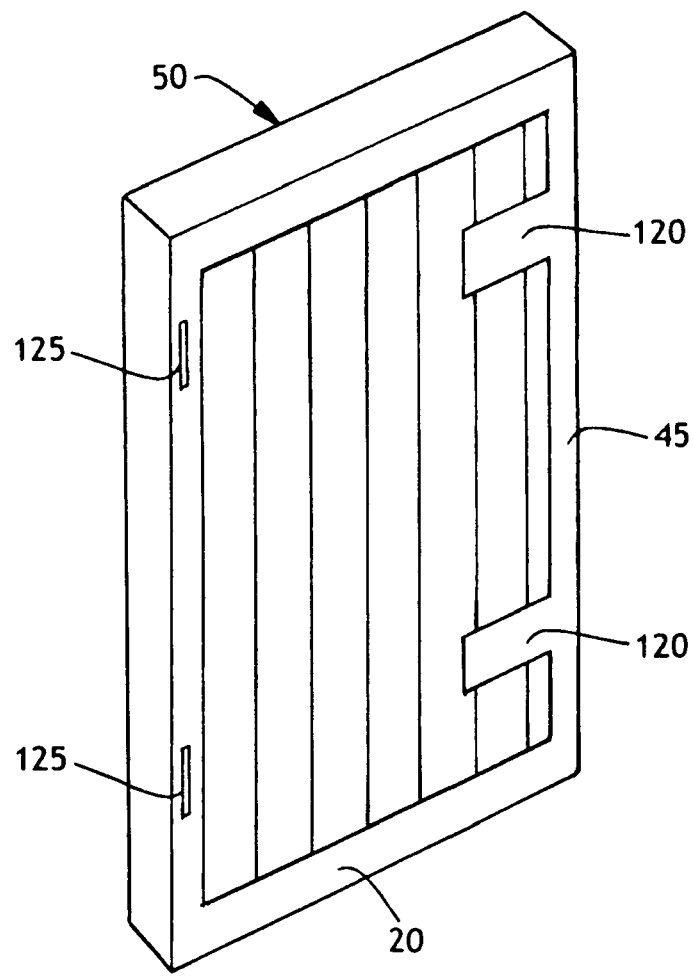
FIGS. 3A through 3E are illustrations of exemplary integrated mechanical fold-over tabs.
Figure 3B:
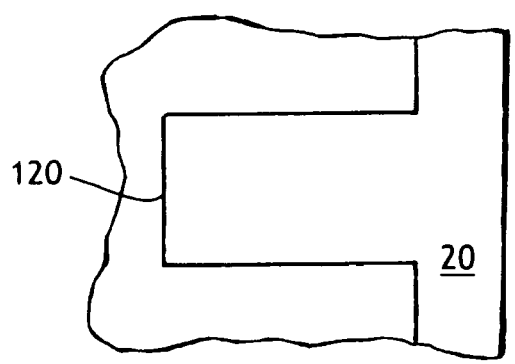
Figure 3C:
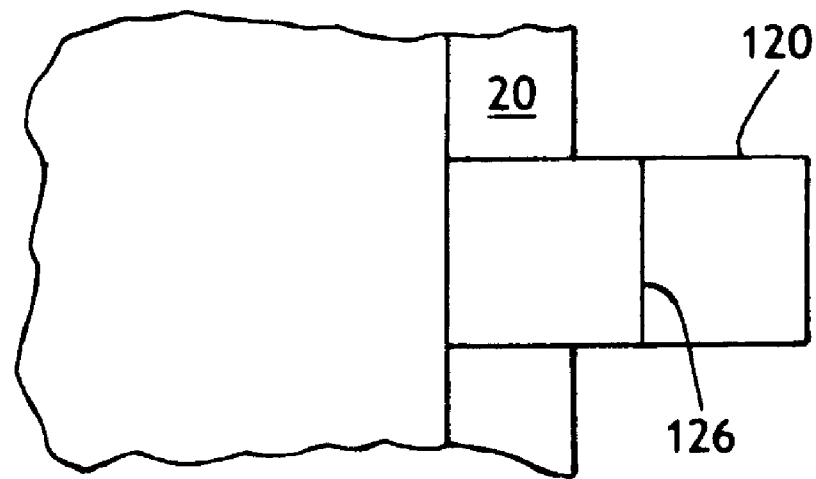
Figure 3D:
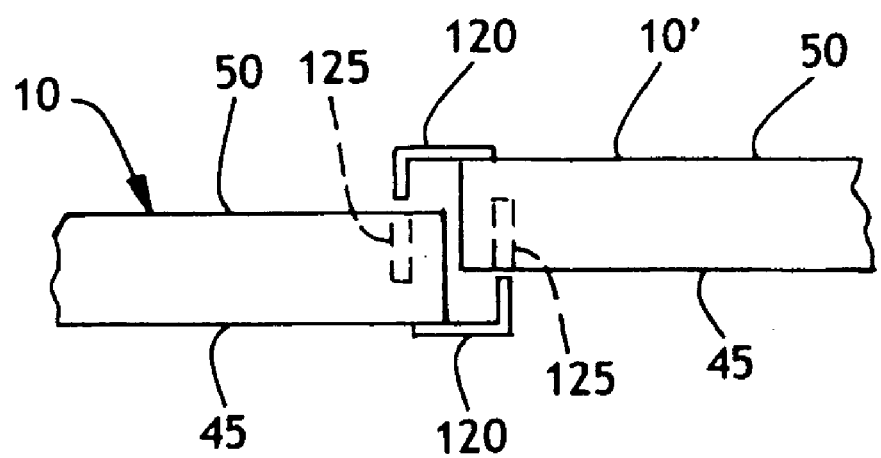
Figure 3E:
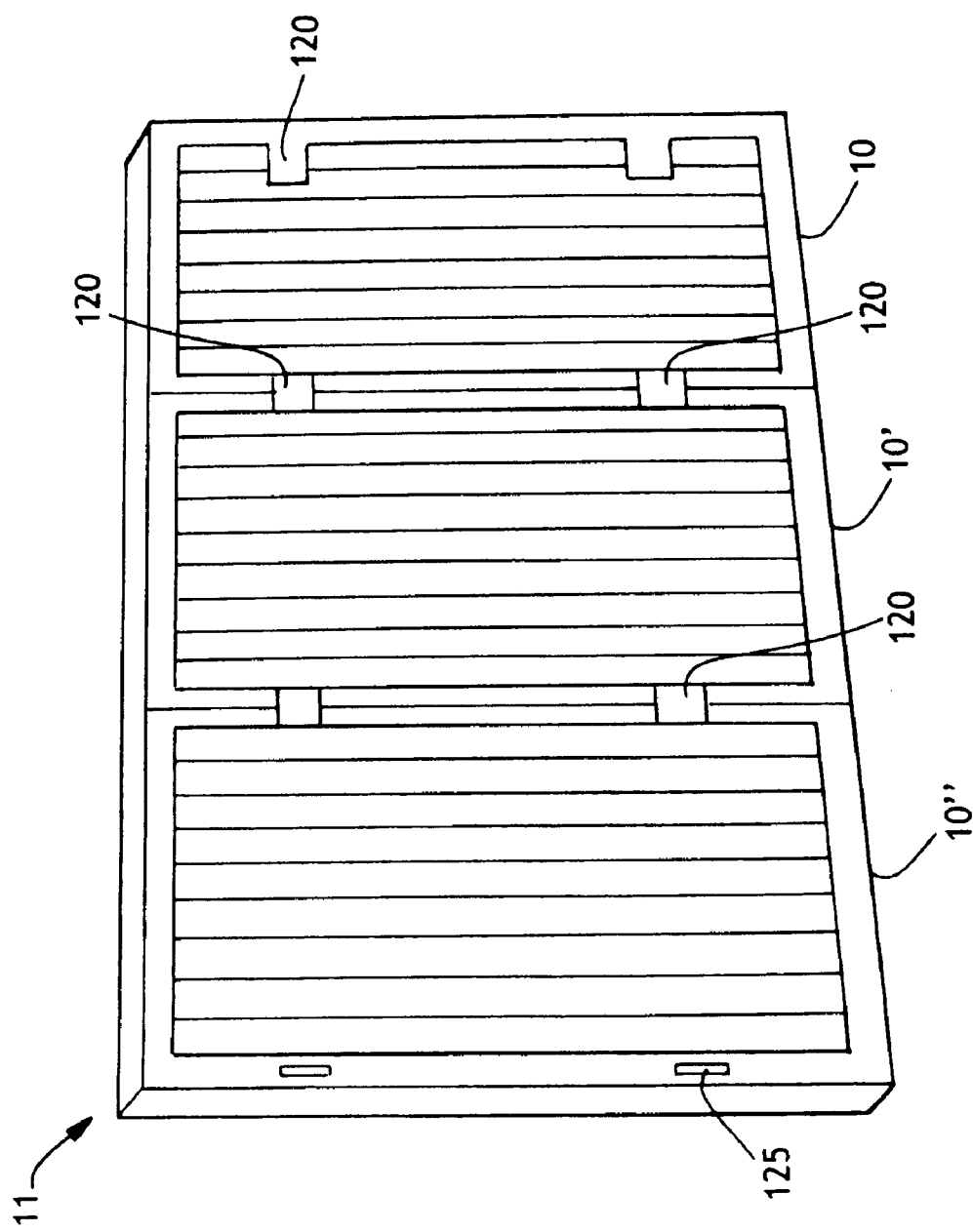

In another embodiment of the present invention, the air filter frame-connecting means 55 may be fold-over mechanical tabs. As is shown in FIG. 3A, fold-over mechanical tabs 120 are integrated into the air filter frame 20. Generally, there are two or more (e.g., a plurality of) integrated fold-over mechanical tabs as shown in FIG. 3A. The fold-over mechanical tabs 120 may be die cut from the material used to form the air filter frame 20. These fold-over tabs may be folded up and over to create a clip-like structure. The tabs may be reinforced with wire, metal foil or other material to increase the strength of the tabs or stiffening the tabs during use. In addition, the fold-over mechanical tabs 120 may have creases 126 at the axis of folding to assist a user in folding the fold-over mechanical tabs 120. FIG. 3B shows a close-up of the fold-over mechanical tabs 120 in the pre-use position. FIG. 3C shows a close-up of the fold-over mechanical tabs 120 when the tab is folded over the air filter frame. In addition to the tab, the air-frame filter may have a complementary tab accepting structure 125 which is adapted to accept and hold the tab 120. The tab accepting structure may be a slot 120, shown in FIG. 3A. The tabs 120 and the complementary tab accepting structure may be present on one or both opposing faces 45 and 50 of the air filter frame. Generally, the fold-over mechanical tabs 120 are present on opposite sides of the opposing faces if the fold-over mechanical tabs 120 are present on both of the opposing sides 45, 50 of the air filter frame 20. FIG. 3D shows how the air filter sub-assemblies 10, 10' containing the integrated fold-over mechanical tabs in their folded-over configuration are arranged to clip or connect with an adjacent air filter sub-assembly 10' to form and air filter assembly 11. FIG. 3E illustrates an exemplary air filter assembly created by connecting a series of air filter sub-assemblies 10, 10' and 10''' together utilizing the integrated fold-over mechanical tabs 120.

Figure 4A:
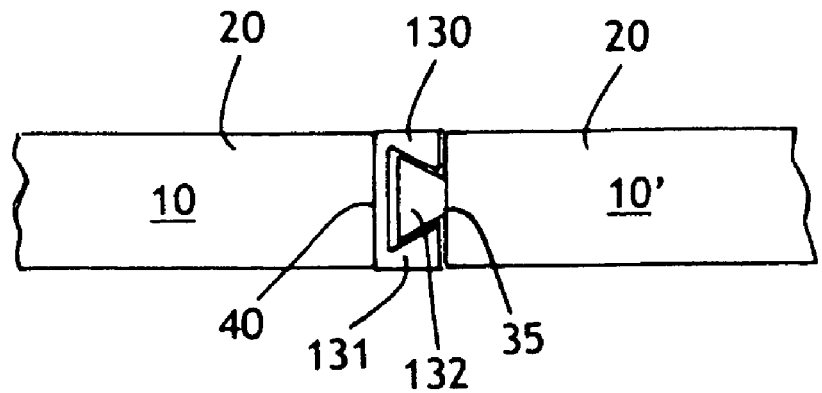
FIGS. 4 and 4A is an illustration of exemplary integrated nested connection devices.
Figure 4:
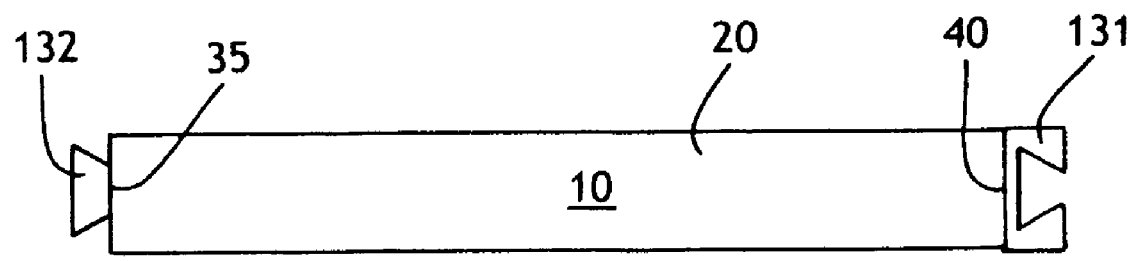

In another embodiment of the present invention, the air filter frame-connecting means 55 may be an integrated nesting connector 130 located at an opposed pair of second sides 35 and 40 of the air filter frame 20. The integrated nesting device may be a male-female nesting connection, or a tongue and groove type of connecting means. An example of the integrated nesting connection device as shown in FIG. 4, which shows a top view of the air filter sub-assembly 10. The air filter sub-assembly has a male connector 132 and a complementary female connector 131 located at opposite opposed surfaces 35, 40 respectively. As shown in FIG. 4, the female connector 131 is at one of the opposed sides 40 of one air filter sub-assembly 10 and the male connector 132 is at an opposite end 35. It is noted that the female and male connectors could be on opposite ends, so long as the air filter sub assemblies can be connected together such that air flow through the filter is in the correct direction. The nesting device elements, female connector 131 and male connector 132, are joined to the air filter frame 20 so they are an integral part of the frame. This type of arrangement allows air filter sub-assemblies 10 and 10' to be joined together, as is shown in FIG. 4A. It is contemplated that the nesting connectors male and female connectors 132, 131 may be formed when the frame is formed, or, in the alternative, the may be attached to the air filter frame after manufacture of the air filter frame. If the connectors are attached to the frame after manufacture of the frame, a mechanical or adhesive means may be used to attach the connectors to the frame. Generally, in this type of connection, the air filter sub-assemblies will be identical.

To join two or more (a plurality on air filter sub-assemblies together using the nesting connectors 130, the male connector 132 of the second air filter assembly 10' is connected with the female connector 131 of the adjacent first air filter sub-assembly 10. In the case of the nesting connector 130 shown in FIG. 4, typically the two air filter sub-assemblies 10 and 10' are joined together by sliding one of the connectors of one sub-assembly into the nested connector of the other assembly. Other methods of joining the male and female connectors maybe used, depending on the structure of the nesting connectors.

Figure 5A:
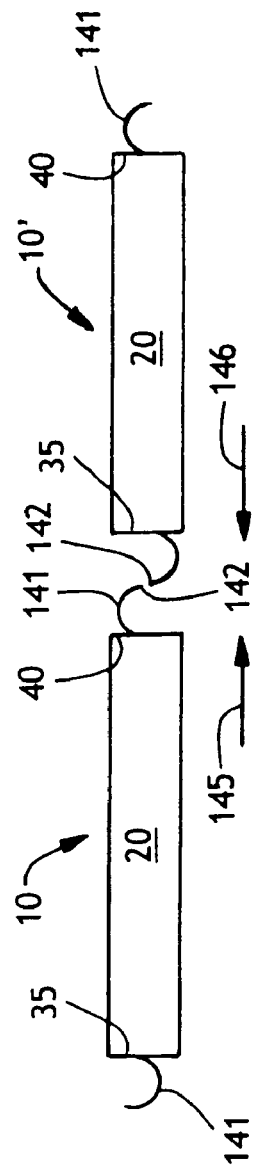
FIGS. 5A through 5C are illustrations of exemplary integrated snap connectors.
Figure 5B:
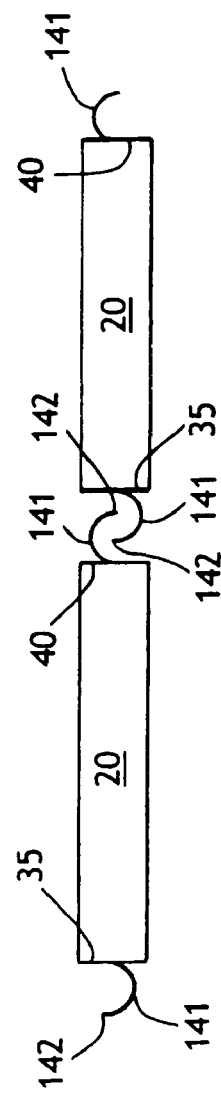
Figure 5C:
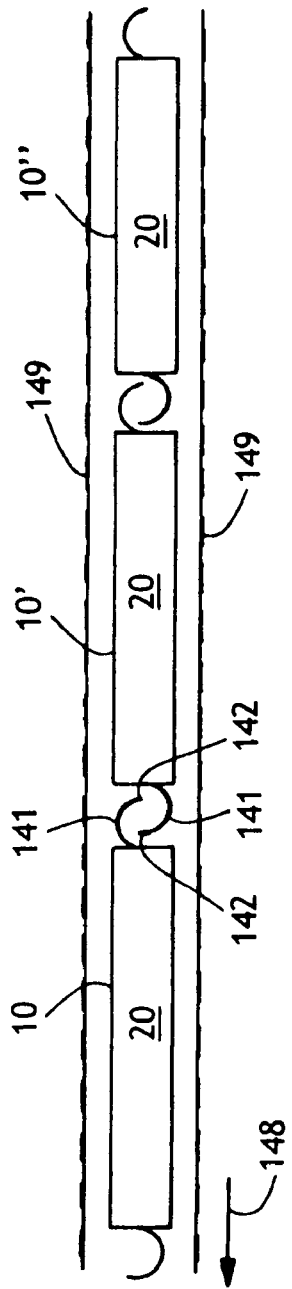

In another embodiment of the present invention, the air filter frame-connecting means 55 may be a snap connector. Generally, there will be two or more (e.g., a plurality on snap connectors integrated into the air filter frame 20, as shown in FIGS. 5A through 5C. FIG. 5A illustrates a top view of one type of snap connectors 141 integrated into the air filter frame 20 prior to being joined together. As shown in FIG. 5A, the snap connectors 141 may be curved hook-like components having a length which extends along all or just a portion of each respective opposed sides 35, 40 of the air filter sub-assemblies 10, 10'. When the air filter sub-assemblies 10, 10' are pushed together in the direction of arrows 145, 146, the snap connectors 141 flex and the distal ends 142 of the connectors push past each other to create a connection, as is shown in FIG. 5B. Generally speaking, displacement of the air filter sub-assembly is restrained by the filter tracks 149 so that the connection is secure and the air filter sub-assemblies 10, 10', 10" remain connected during extraction of the air filter assembly in the direction 148 as shown in FIG. 5C. The snap connectors 141 shown in FIG. 5A are typically prepared from a rigid material such as a metal or plastic but should have enough flex to allow the air filter sub-assemblies 10, 10' to be connected together. It is noted, however, that other materials, including paper or cardboard may also be used to form the snap connectors, so long as the resulting snap connector is rigid enough to hold the adjacent air filter sub-assemblies together during use.

Figure 6A:
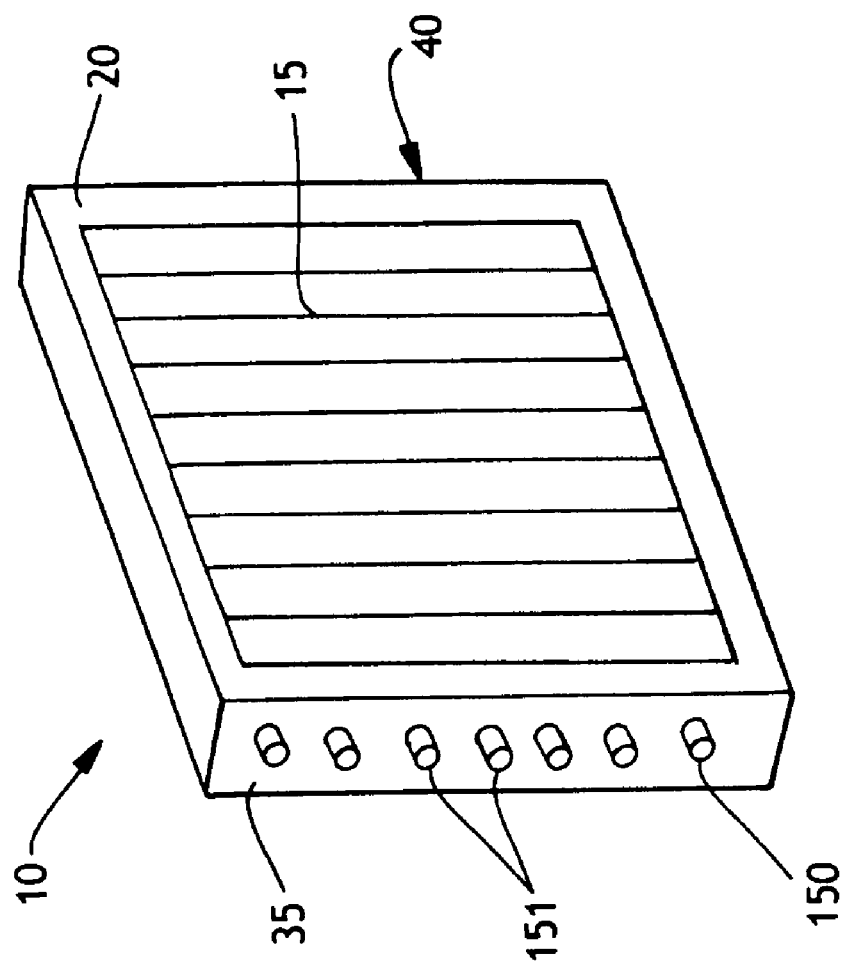

The snap connectors may also be in the form of a friction fit connector that may be generally of the type found in LEGO® toys. Such friction fit connectors are generally illustrated in FIG. 6A through FIG. 6F involving a series of male connectors 151 and a complementary female connector elements 152. FIG. 6A shows a perspective view of an air filter sub-assembly 10 having a friction fit snap connectors 150 on one of the opposed pair of second sides 35 and 40 of the air filter frame 20. In the case of FIG. 6A, the friction fit snap connectors are male connectors 151. The male connector elements shown in top view in FIG. 6B are configured along all or a portion of one of the opposed sides 35 of an air filter sub-assembly 10 as shown in FIG. 6C and the female elements 152 are shown in top view in FIG. 6D are configured along all or a portion of the other opposed side 40 of an air filter sub-assembly 10 as shown in FIG. 6E. When the air filter sub-assemblies 10 and 10' are brought together, such that the male connector elements 151 of one air filter sub assembly 10 come into contact with the female connector elements 152, as is illustrated in FIG. 6F, a connection is made, forming an air filter assembly. To separate the two air filter sub-assemblies form one another, the filters may be pulled apart by applying a tensioning force greater that the force needed to remove the air filter sub-assemblies from an air handling unit. It is noted that the male connectors 151 and the female connectors 152 may be cylindrical, triangular, square, hex-shaped, to name a few. These shape and other shapes may be used alone or in combination with one another.

Figure 6G:
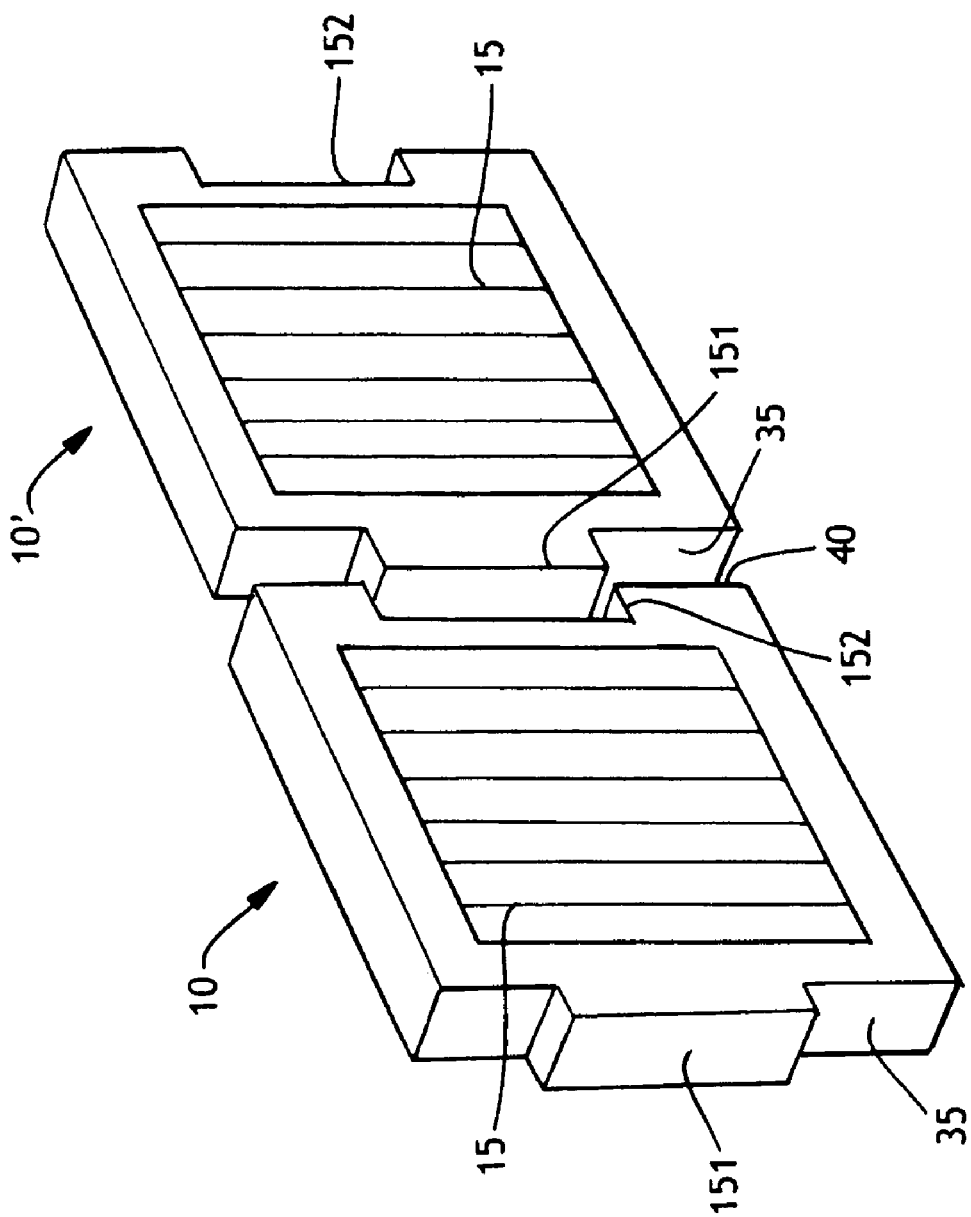

In another embodiment of a friction fit snap connection as is shown in FIG. 6G, a portion of one of the opposed sides 35 of the air filter sub-assembly 10, 10' is configured as a male friction fit snap element 151 and a portion of the other opposed side 40 of the air filter sub-assembly is configured as a female friction fit snap element 152. When the two sub-assemblies 10, 10' are brought together as shown in FIG. 6G, the two sub-assemblies form an air filter assembly which may be used in an air filtration bank of an air handing unit. It is contemplated that the nesting male and female connectors 151, 152 may be formed when the frame is formed, or in the alternative, they may be attached to the air filter frame after manufacture of the air filter frame. If the connectors are attached to the frame after manufacture of the frame, a mechanical or adhesive means may be used to attach the connectors to the frame.

In another embodiment of the present invention, the air filter frame-connecting means may be an integrated hook and loop fastening system (not shown in the drawings). Generally speaking, suitable hook and loop fastening systems may be available from, for example, VELCRO USA, Inc. A variety of hook materials are available and one of ordinary skill could readily select an appropriate hook material. In the various aspects and configurations of the invention, the loop material can be provided by a nonwoven, woven or knit fabric. For example, a suitable loop material fabric can be composed of a 2 bar, warp knit fabric of the type available from Guilford Mills, Inc., Greensboro, N.C. under the trade designation #34285, as well as other types of knit fabrics. Suitable loop materials are also available from the 3M Company, which has distributed a nylon woven loop under their SCOTCHMATE brand. The loop material may also include a nonwoven fabric having continuous bonded areas defining a plurality of discrete unbonded areas. Examples of suitable point-unbonded fabrics are described in U.S. Pat. No. 5,858,515 entitled PATTERN-UNBONDED NONWOVEN WEB AND PROCESS FOR MAKING THE SAME, by T. J. Stokes et al.; the entire disclosure of which is incorporated herein by reference in a manner that is consistent herewith.

The hook material would be configured along all or a portion of one of the opposed sides of the air filter sub-assembly and the loop material would be configured along all or a portion of the other opposed side of the air filter sub-assembly, much in the same manner as the other air filter connecting means as described herein.

In a different embodiment of the present invention, the air filter frame-connecting means may be two or more (e.g., a plurality on integrated magnetic connectors or an integrated magnetic fastening system. Generally speaking, these magnetic connectors are conventional magnets tabs, magnetic discs or other shapes, magnetic strips, magnetic tapes and the like. One set of the magnetic material would be configured along all or a portion of one of the opposed sides of the air filter sub-assembly and the corresponding magnetic material would be configured along all or a portion of the other opposed side of the air filter sub-assembly. The orientation of the magnets should be such that the poles of the magnets on each air filter sub-assembly should attract the magnets of the adjacent filters, not repel the adjacent filter.

Figure 7A:
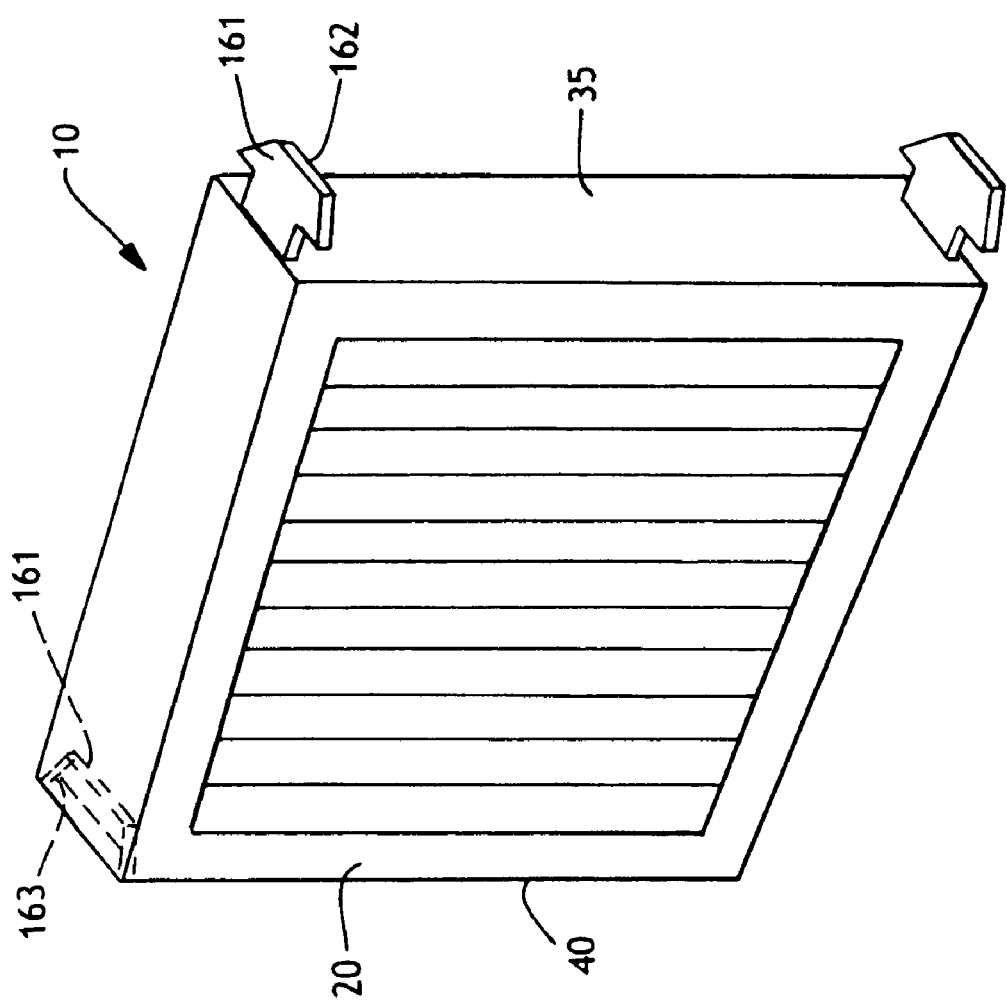

In another embodiment of the present invention, the air filter frame-connecting means may include an integrated slot-tab connector as generally shown in FIG. 7A. A slot-tab connector is generally composed of two elements, a tab 162 and a complementary slot 163, which is adapted in size and shape to accept and retain the tab 162 within the slot 163. FIG. 7A shows an air frame sub-assembly 10 having the slot-tab connector 161, with the tab 162 located on one of the opposing sides 35 of the air filter frame 20 and the slot 163 located on the other opposing surface 40. Typically, the tab will have a portion or ear 164, which is slightly wider that the slot 163 opening. This will cause the tab 161 to be retained in the slot The slot-tab connector 161 allow two or more air filter sub-assemblies to be joined together, as is shown in FIG. 7B. A complementary slot 163, shown in FIG. 7B located on the other opposing side 140. The complementary slot 163 of one sub assembly 10' is adapted in size and shape to accept the tab 162 of another sub-assembly 10. The tab 162 is inserted into the slot 163. Generally, the tab 162 is made of a material that is slightly deformable so it can fit into the slot 163. Alternatively, the slot 163 is formed in the air filter frame 20 which is constructed in a manner that the slot 163 can be slightly expanded to receive the tab 162. As is shown in FIG. 7A, generally speaking, multiple tab elements 162 would be configured along one of the opposed sides 35 of the air filter sub-assembly 10 and multiple slot elements 163 would be formed or configured on the other opposed side 40 of the air filter sub-assembly 10. This will allow the sub assemblies to be joined in a manner shown in FIG. 7B.

Other similar air filter connecting means 55 may be used in the present invention. It is also noted that the connecting means are described above as being on the opposed pair of second sides 35 and 40, but could in fact be on the opposed pair of first sides 25 and 30 in addition to or in place of the opposed pair of second sides 35 and 40. The air filter frame-connecting means 55 can be disposed along at least a portion of the opposed first sides 25, 30 and/or opposed second sides 35, 40 or it may be disposed along the entirety of the opposed first sides and/or opposed second sides. As shown in the drawing discussed above, the air filter sub-assemblies 10, 10' and 10" are generally identical to each other. However, it is possible that the air filter sub-assemblies could be of different sizes.

The air filtration media may be conventional air filtration material. Although paper filters and mixed media filter materials are frequently used, desirable air filtration media include non-woven fibrous web materials as well as laminates of these materials. Exemplary materials include, for example, U.S. Pat. No. 6,815,383 entitled "Filtration Medium with Enhanced Particle Holding Characteristics"; U.S. Pat. No. 6,624,100 entitled "Microfiber Nonwoven Web Laminates"; U.S. Pat. No. 6,322,604 entitled "Filtration Media and Article Incorporating the Same"; and U.S. Pat. No. 6,274,041 entitled "Integrated Filter Combining Physical Adsorption and Electrokinetic Adsorption", each hereby incorporated by reference. Essentially, any known air filtration media may be used in the air filter sub-assembly. The air filtration may be a flat in mature or may be pleated within the air filter frame.

Figure 8A:
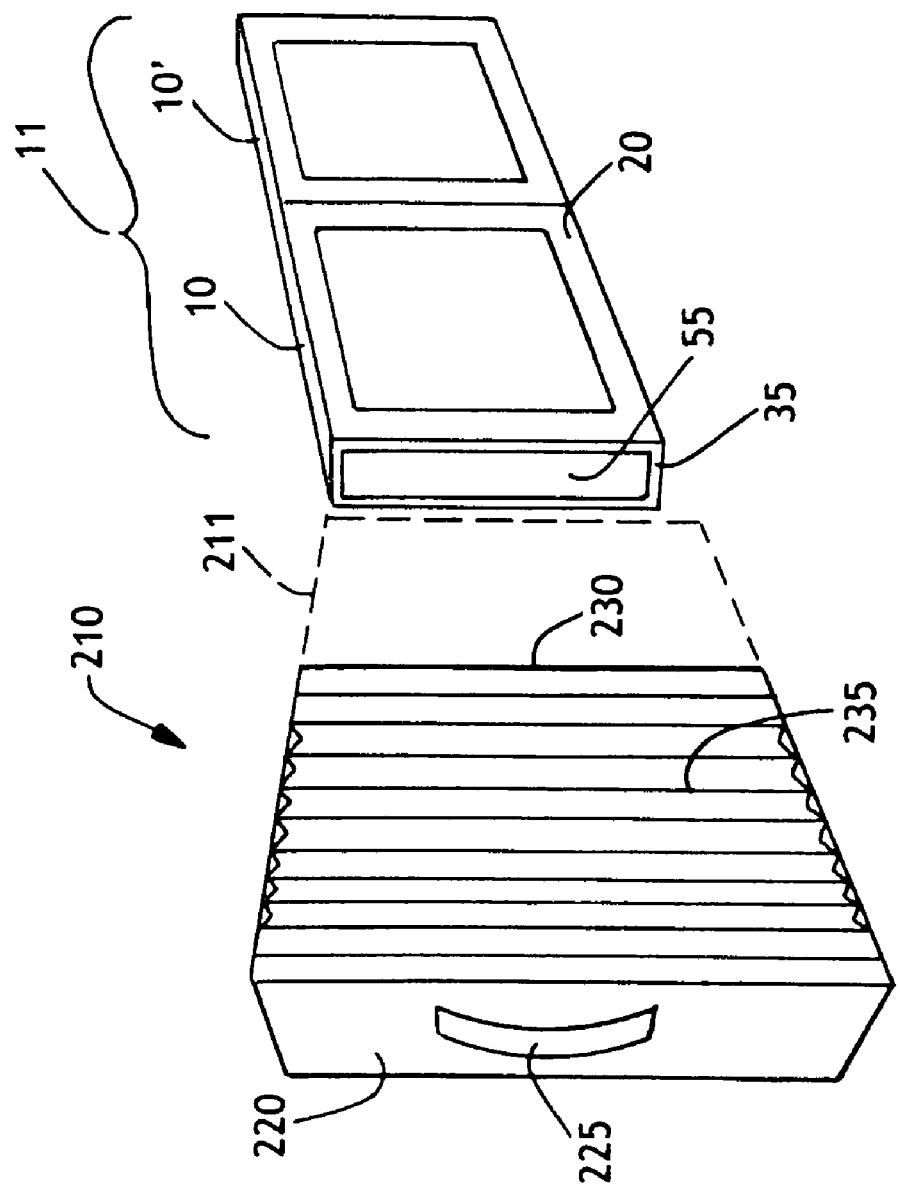
FIGS. 8A and 8B are illustrations of an exemplary expandable gap filling sub-assembly.

In an embodiment of the present invention, the disposable air filter sub-assembly may further include an expandable gap filling structure. An exemplary expandable gap filling structure 210 is shown in FIG. 8A. This expandable gap filling structure 210 is typically the last piece to be installed on the filter track of the filter bank and is used to fill or block any gaps or spaces between the end of the air filter sub-assemblies 10, 10' forming the air filter assembly 11 and the end of the filter track or duct (not shown). Generally speaking, this expandable gap filling structure 210 will have a first end 220 which faces away from the air filter assembly 11, and a second end 230 which faces or comes into contact with the opposed sides 35 of an air filter sub-assembly 10. The second end 230 may have a connecting means integrated into the second side which will contact and connect to the connecting means 55 on the air-filter subassembly. It is noted that the connection means on the expanding gap filling structure may be located on another surface of the expandable gap filling structure 220. As shown in FIG. 8A, the expandable gap filling structure may be expanded as shown by element 211.

The expandable gap filling structure 220 may have dimensions generally the same as either the first opposed sides or the second opposed sides of an air filter frame. The expandable gap filling structure may include one of the integrated connecting means described above along at least a portion of a side so that the integrated connecting means can connect the expandable gap filling structure to a plurality of air filter sub-assemblies. This connection should have sufficient structural strength in at least one direction so that the connection resists separation upon extraction of the air filter assembly from the filter track of a filter bank.

Figure 8B:
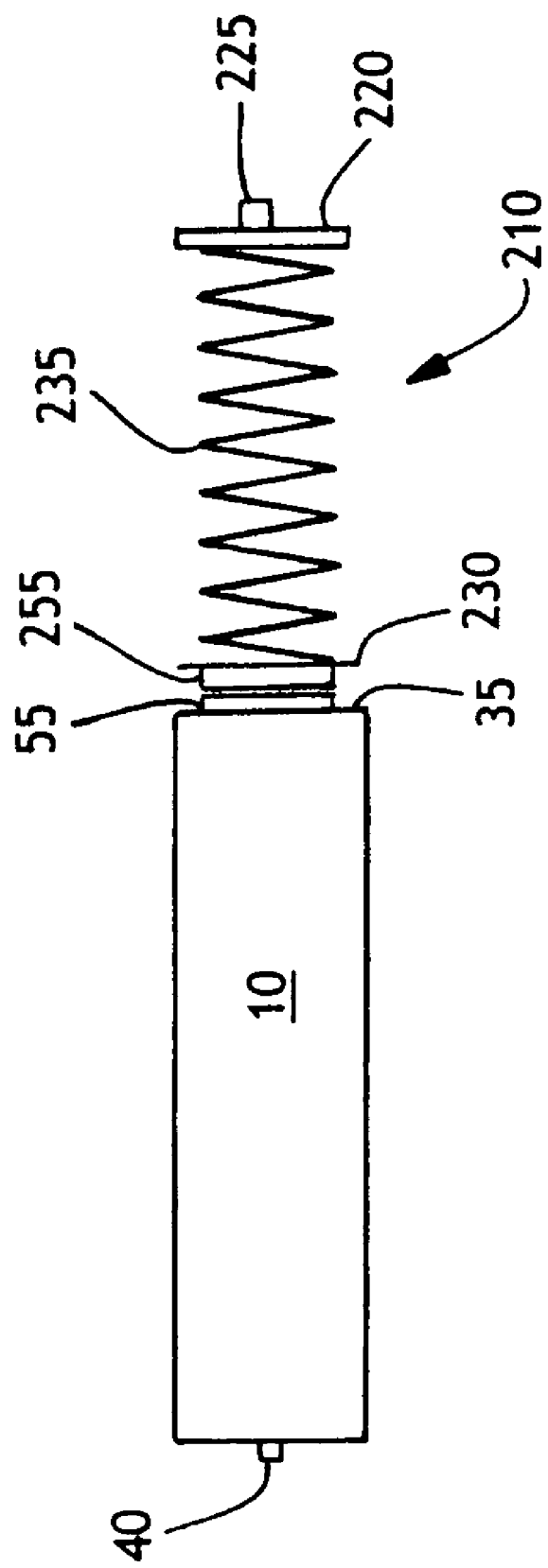

As is shown in FIG. 8A, the expandable gap filling structure 210 may be an accordion folded or pleated material 235, a series of foam pieces (not shown) or other construction adapted to block passage of air while having dimensions generally the same as either the first opposed sides 25, 30 or the second opposed sides 35, 30 of an air filter frame 20. The expandable gap filling structure 210 may have a handle or pull 225 to assist in expansion and to aid in extraction of the air filter assembly 11 to which the expandable gap filler structure 210 is attached. FIG. 8B is a top view of an expandable gap filling structure showing 210 as an accordion fold or pleated construction as it extends from the end of an air filter sub-assembly 10. As can be seen, the extendable gap filling structure 210 is connected to an air filter sub-assembly 10 through a connection means 55 on the air filter sub-assembly and a connection means 255 on the expandable gap filler structure 210 at the second end 230. In an alternative embodiment, the expandable gap filler may be prepared from a foam or other material that is adapted to provide a force that urges or pushes against the closed end of the filter bank and the adjacent opposed ends of the air filter sub-assemblies to further close or minimize gaps between the air filter sub-assemblies.

The present invention also encompasses an air filter system 11 composed of at least two disposable air filter sub-assemblies 10, 10' (i.e., a plurality of disposable air filter sub-assemblies) as generally described above and shown in various Figures, such as FIGS. 3E and 8A. More particular, the air filter system 11 of the present invention utilizes the air filter frame sub-assemblies 10, 10', 10" having the air filter frame-connecting means integrated into the air filter frame 20 to join the air filter sub-assemblies together. In addition, the air filter system 11 described above may further include an expandable gap filling sub-assembly, also describe above and shown in FIGS. 8A and 8B.

In another embodiment of the invention, the air filter frame-connecting means 55 may form a pivotal connection between the air filter sub-assemblies 10. This pivotal connection between multiple air filter sub-assemblies may be alternating pivotal connections.

In another aspect of the invention, the integrated air filter frame-connecting means may include a frangible portion. This frangible portion can be used to separate individual filter sub-assemblies upon extraction of the filter.

Figure 9A:
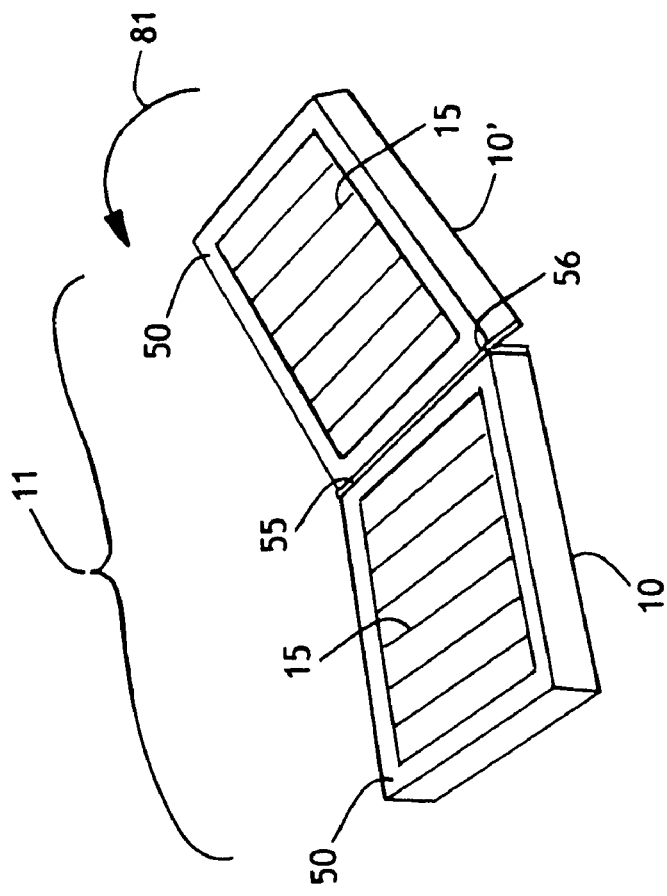
FIGS. 9A and 9B are illustrations of an exemplary integrated pivotal connection between air filter sub-assemblies and an exemplary advantage provided by such an integrated pivotal connection.
Figure 9B:
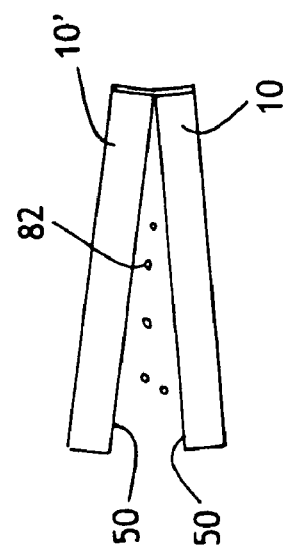

It is contemplated that the air filter frame-connecting means 55 may be adapted to form a pivotal connection 56 between air filter sub-assemblies 10, 10', as is shown in FIG. 9A. The pivotal connection 56 can be configured so that an air-flow facing face or front face 50 of each air filter sub-assembly 10, 10' in an air filter assembly 11 can be pivoted into a closed, face-to-face relationship upon extraction of the air filter assembly 11 from the filter track of a filter bank, by rotating the air filter sub assemblies 10, 10' in a direction 81 as generally illustrated in FIG. 9A. This may assist in prevention of dirt particles or dust cake collected on the air-flow facing side of the filter media 15 from becoming dislodged during a filter change and/or removal of the air filter assembly 11 from a building of place of use. Such an arrangement will capture or enclose the dust cake collecting on the air-flow facing side of the air filter sub-assembly as generally illustrated in FIG. 9B.

Figure 10A:
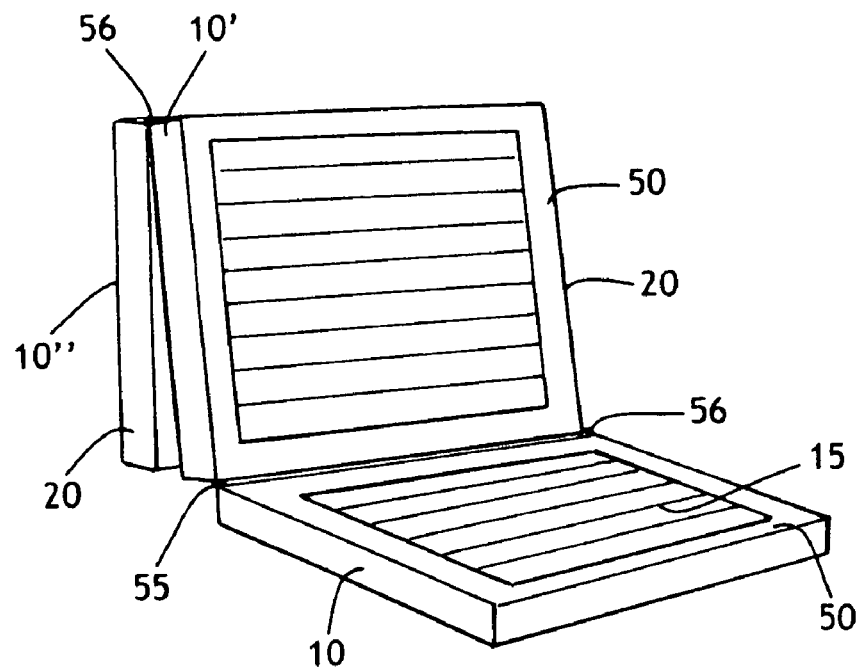
FIGS. 10A and 10B are illustrations of an exemplary air filter sub-assembly composed of multiple air filter frames and associated air filtration media with a hinge pivotally connecting the air filter frames.
Figure 10B:
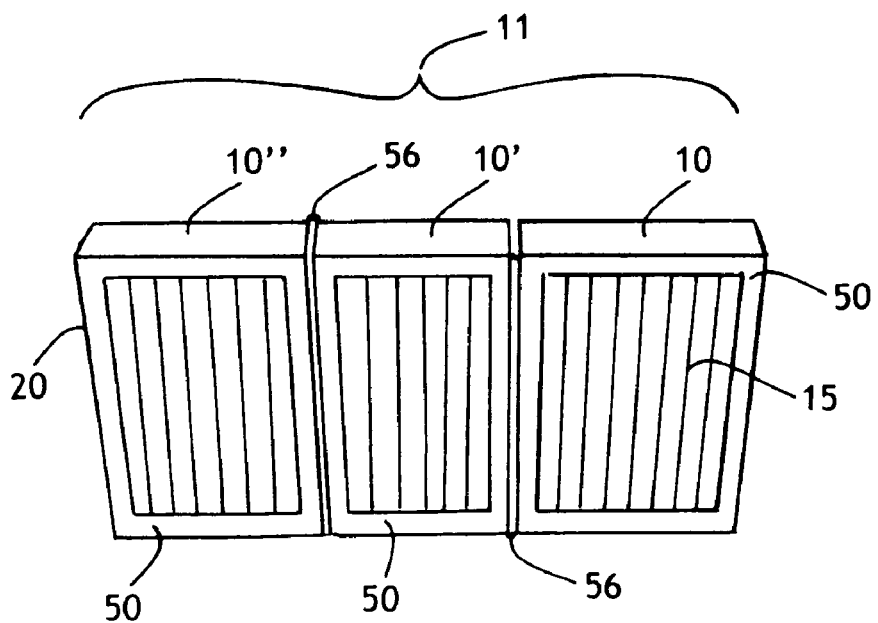

In an embodiment of the present invention, the disposable air filter assembly 11 may be composed of two or more air filter sub-assemblies 10, 10', 10" with a pivotal connection 56, such as a hinge, connecting the two or more air filter frames 20 and associated filter media 15 as generally illustrated in FIG. 10A. As is shown in FIG. 10A, there are air filter sub-assemblies 10, 10' and 10" in a partially unfolded configuration and FIG. 10B shows air filter sub-assemblies 10, 10' and 10" in an unfolded configuration.

Each air filter sub-assembly 10, 10', 10" of the air filter assembly 11 has a hinge 56 pivotally connecting each air filter sub-assembly to the adjacent air filter sub-assembly. As shown in FIGS. 10A and 10B, the first air filter sub-assembly 10 is pivotally connected with the second air filter sub-assembly 10' and the second air filter sub-assembly 10' is connected to the third air filter sub-assembly 100". If additional air filter sub-assemblies are present, the additional air filter sub-assemblies may be joined with adjacent air filter sub-assemblies in the same manner. The hinge 56 may be located at a first opposed face 45 or second opposed face 50 of the respective filter frames depending on the desired dimensions of the unfolded configuration, as is shown in FIGS. 10A and 10B. Alternatively, the hinge 56 may be located on the first pair of opposed sides 25, 30 or second pair of opposed sides 35, 40. The hinge 56 may be made of a wide variety of materials that are generally flexible. Examples of suitable materials for the hinge include materials such as a flexible paper, a plastic film, a nonwoven web such as, for example, a web of spunbond filaments or a web of meltblown filters or laminates of various combinations of these materials. The hinge may be impermeable or it may be permeable and function as an additional air filtration component.

In addition, to having the hinge as described above, the hinged air filter assembly 11 may be composed of a relatively small number of hinged sub-assemblies, such as 2-10. Having more than about 10 air filter sub-assemblies hinged together may make the air filter assembly 11 too bulky to handle, particularly in a tight or confined space. Therefore, it is possible that the air filter frame-connecting means 55 (also referred to as connecting components or connecting elements) may be integrated into the air filter frame 20 of the hinged air filter assembly in addition to the hinges. This would allow a longer air filter assembly to be formed. Generally, the air filter frame-connecting means 55 may be located on either: (i) the remaining non-connected first side or second side of the respective filter frames that are generally parallel with the hinge; or (ii) on the opposed pair of first sides or the opposed pair of second sides that are generally perpendicular to the hinge. In this situation, the group of hinged sub-assemblies actually forms a sub-assembly having multiple air filter frames and filter media which may be joined to additional single sub-assemblies or sub-assemblies having multiple air filter frames and filter media.

According to the invention, a third air filter frame and associated media (or more) or third sub-assembly 10" may be added to the disposable air filter sub-assembly chain 10 and 10' with a hinge 56 pivotally connecting the additional air filter sub-assembly to the air filter sub-assembly chain 10 and 10', which will result in a longer air filter sub-assembly chain. The disposable air filter sub-assembly chain 11 may be used as is or may be joined together with one or more other air filter sub-assemblies and/or expandable gap filling sub-assembly or assemblies to form an air filter assembly as described above. Desirably, the hinge 56 connections are configured as alternating pivotal hinge connections as generally illustrated in FIG. 10A and FIG. 10B so each air filter frame in the sub-assembly is able to pivot to create an accordion fold so that air flow facing faces 45 of the sub-assembly chain 11 can be joined together to trap or contain the collected dust cake 82 on the filter media 15 as is shown in FIG. 9B.

In an additional embodiment of the invention, the hinge 56 that pivotally joins the plurality of air filter frames 20 and associated air filtration media 15, (air filter sub-assembly 10) that form an air-filter sub assembly chain 11, may include a frangible portion 58 so that the individual air filter frames of the air filter sub-assembly may be separated either during installation or for disposal. This is generally illustrated in FIG. 11A and FIG. 11B. The frangible portion 58 of the hinge 56 may contain spaced-apart perforations, a score line, a thinned zone or a strip of weaker material that separates upon application of an appropriate level of force. Alternatively, the hinge 56 may contain a wire, string or strip connected to a pull tab that, when pulled, results in separation of the hinge 56. The frangible portion should have sufficient structural strength in at least one direction so that the frangible portion 58 resists unintended separation upon extraction of the air filter assembly 11 from the filter track of a filter bank.

Desirably, the pivotal hinge 56 connection can be configured so that an air-flow facing face 45 of each air filter frame 20 connected by the hinge 56 in the air filter sub-assembly chain 11 can be pivoted into a closed, face-to-face relationship as generally illustrated in FIG. 12A. Such a configuration provides advantages for storing the air filter sub-assembly chain 11 and also provides advantages upon extraction of the air filter assembly 11 from the filter track of a filter bank. Such an arrangement will capture or enclose the dust cake collecting on the air-flow facing 45 side of each air filter frame 20 as generally illustrated in FIG. 12B and FIG. 9B. Stated another way, the four air filter sub-assemblies 10, 10', 10" and 10''' are folded such that air flow facing face 45 of each air filter sub-assembly contacts the air flow facing face of an adjacent air filter sub-assembly. The air filter frame-connecting means 55 at the opposed ends of the air filter sub-assembly chain 11 may be used to secure the air filter sub-assembly chain 11 in the closed configuration for disposal, as is shown by FIG. 12B. In addition, the hinged filters also allow installers a way to conveniently transport the air filters to the filter back. That is, the hinged filters are bound together as a single unit, which allows the installer to better handle the multiply filters during transportation of the filters to the place of use.

Another feature of the present invention is illustrated in FIGS. 13A to 13C. The pivotal hinges connecting a series of four air filter frames into a sub-assembly allow a variety of configurations. For example, the air filter sub-assembly may be in a completely unfolded configuration as illustrated in FIG. 13A. Alternatively, two of the four air filter frames in the air filter sub-assembly may be folded back to generate the configuration illustrated in FIG. 13B. Alternatively, the air filter sub-assembly may be used in the configuration illustrated in FIG. 13C. That configuration may require, in some embodiments, the separation of a frangible portion of a hinge. Of course, other configurations and arrangements are contemplated.

These configurations allow the air filter sub-assembly to provide a variety of size configurations. For example, if each air filter frame had dimensions of 2 feet high by 2 feet wide by 4 inches thick, an air filter sub-assembly composed of four air filter frames could have dimensions of: a) 2 feet high by 8 feet wide by 4 inches thick; b) 2 feet high by 4 feet wide by 8 inches thick; or c) 2 feet high by 2 feet wide by 16 inches thick. Of course, may other configurations are possible if the pivotal hinge connecting the air filter frames into an air filter sub-assembly is frangible. For example, at least the following configurations are possible if one or more of the frangible hinges are separated and one or more of the air filter frames in the air filter sub-assembly are removed: 2 feet high by 6 feet wide by 4 inches thick; b) 2 feet high by 4 feet wide by 4 inches thick; c) 2 feet high by 2 feet wide by 12 inches thick; or d) 2 feet high by 2 feet wide by 8 inches thick.

The present invention further includes a method of preparing an air-filter assembly for removal utilizing any of the air filter sub-assemblies described above. Generally speaking, the method includes the following steps: (a) providing a first air filter sub-assembly; (b) providing a second air filter sub-assembly; and (c) connecting the first air filter sub-assembly and the second air filter sub-assembly utilizing the integrated air filter frame-connecting means during insertion into a filter bank of an air handling system. If additional sub-assemblies are to be added to form the air filter assembly, the method may further include the following additional steps: providing at least a third air filter sub-assembly; and connecting the third air filter sub-assembly and the second air filter sub-assembly utilizing the integrated air filter frame-connecting means during insertion into a filter bank of an air handling system. The integrated air filter frame-connecting means are those connecting means described above. According to the method of the present invention, the integrated air filter frame-connecting means connect the air filter sub-assemblies into an air filter assembly having sufficient structural strength in at least one direction so that the air filter sub-assemblies resists separation upon extraction of the air filter assembly from a filter track of a filter bank.

In addition, the method of the present invention may also include the following steps: providing an expandable gap filling sub-assembly having dimensions generally the same as either the first opposed sides or the second opposed sides of an air filter frame and including integrated connecting means disposed along at least a portion of a side; and connecting the expandable gap filling sub-assembly to a plurality of air filter sub-assemblies utilizing the integrated connecting means during insertion into a filter bank of an air handling system. According to the method of the present invention, the gap filling sub-assembly is connected with sufficient structural strength in at least one direction so that the connection resists separation upon extraction of the air filter assembly from the filter track of a filter bank.

In addition to providing a way for the filters to be connected in the filter bank, the connected filters also help reduce air by-pass by reducing or eliminated the size of any gaps between adjacent filters. That is, the air frame connecting means may reduce or eliminate any gaps between the filters.

These and other features and advantages of the invention will become more apparent to one skilled in the art from the following description and claims when read in light of the accompanying drawings.

While particular embodiments of the present invention have been described herein; it will be apparent to those skilled in the art that alterations and modifications may be made to the described embodiments without departing from the scope of the appended claims.

What is claimed is:

1. A disposable air filter sub-assembly comprising:
   air filtration media;
   a substantially planar air filter frame providing three-dimensional support for the air filtration media, the air filter frame having an opposed pair of first sides, an opposed pair of second sides, two opposed faces, a width between the opposed faces; and
   an air filter frame-connecting means integrated into the air filter frame, the air filter frame-connecting means is selected from: integrated fold-over adhesive tabs located on one of the faces of the air-filter frame, integrated fold-over mechanical tabs located on at least one of the faces of the air-filter frame, integrated nesting connection devices located on at least one of the sides of the air-filter frame, integrated snap connectors located on at least one of the sides of the air-filter frame, integrated hook and loop fasteners located on at least one of the sides of the air-filter frame, integrated magnetic connectors located on at least one of the sides of the air-filter frame, or integrated slot-tab connectors located on at least one of the sides of the air-filter frame;
   wherein the air filter frame-connecting means is adapted to connect a plurality of air filter sub-assemblies into an air filter assembly having sufficient structural strength in at least one direction so that the air filter sub-assemblies resists separation upon extraction of the air filter assembly from a filter track of a filter bank.

2. The disposable air filter sub-assembly of claim 1, wherein the air filter frame-connecting means is further adapted to form a pivotal connection.

3. The disposable air filter sub-assembly of claim 2, wherein the air filter frame-connecting means is further adapted to form alternating pivotal connections.

4. The disposable air filter sub-assembly of claim 1, wherein the integrated air filter frame-connecting means includes a frangible portion.

5. The disposable air filter sub-assembly of claim 1, wherein the air filtration media is selected from paper, non-woven fabrics and combinations thereof.

6. The disposable air filter sub-assembly of claim 1, wherein the air filter frame-connecting means is selected from the group consisting of integrated nesting connection devices located on at least one of the sides of the air-filter frame, integrated snap connectors located on at least one of the sides of the air-filter frame, integrated hook and loop fasteners located on at least one of the sides of the air-filter frame, integrated magnetic connectors located on at least one of the sides of the air-filter frame, and integrated slot-tab connectors located on at least one of the sides of the air-filter frame.

7. The disposable air filter sub-assembly of claim 6, further comprising an expandable gap filling structure having dimensions generally the same as either the first opposed sides or the second opposed sides of an air filter frame; the expandable gap filling structure having a first end which faces away from the air filter assembly and a second end which comes into contact with a side of the air filter assembly, where the first end comprises the air filter frame-connecting means disposed along at least a portion of the first end of the expandable gap filling structure so that the air filter frame-connecting means of the gap filling structure are adapted to connect the expandable gap filling structure to a plurality of air filter sub-assemblies with sufficient structural strength in at least one direction so that the connection resists separation upon extraction of the air filter assembly from the filter track of the filter bank.

8. The disposable air filter sub-assembly of claim 7, wherein the expandable gap filling structure comprises a series of foam pieces having dimensions generally the same as either the first opposed sides or the second opposed sides of an air filter frame.

9. The disposable air filter sub-assembly of claim 1, wherein the air filter frame-connecting means is selected from the group consisting of integrated fold-over mechanical tabs located on at least one of the faces of the air-filter frame, integrated snap connectors located on at least one of the sides of the air-filter frame, integrated hook and loop fasteners located on at least one of the sides of the air-filter frame, integrated magnetic connectors located on at least one of the sides of the air-filter frame, or integrated slot-tab connectors located on at least one of the sides of the air-filter frame.

10. A method of preparing an air-filter assembly for removal utilizing the air filter sub-assembly of claim 1, comprising:
providing a first air filter sub-assembly;
providing a second air filter sub-assembly;
connecting the first air filter sub-assembly and the second air filter sub-assembly utilizing the air filter frame-connecting means during insertion into a filter bank of an air handling system;
wherein the air filter frame-connecting means connect the air filter sub-assemblies into an air filter assembly having sufficient structural strength in at least one direction so that the air filter sub-assemblies resists separation upon extraction of the air filter assembly from the filter track of a filter bank.

11. The method of claim 10 further comprising:
providing at least a third air filter sub-assembly;
connecting the third air filter sub-assembly and the second air filter sub-assembly utilizing the air filter frame-connecting means during insertion into a filter bank of an air handling system;
wherein the air filter frame-connecting means connect the air filter sub-assemblies into an air filter assembly having sufficient structural strength in at least one direction so that the air filter sub-assemblies resists separation upon extraction of the air filter assembly from the filter track of a filter bank.

12. The method of claim 10, further comprising:
providing an expandable gap filling sub-assembly having dimensions generally the same as either the first opposed sides or the second opposed sides of an air filter frame and including air filter frame-connecting means disposed along at least a portion of a side;
connecting the expandable gap filling sub-assembly to a plurality of air filter sub-assemblies utilizing the integrated connecting means during insertion into a filter bank of an air handling system;
wherein the gap filling sub-assembly is connected with sufficient structural strength in at least one direction so that the connection resists separation upon extraction of the air filter assembly from the filter track of a filter bank.

13. An air filter system having at least two disposable air filter sub-assemblies, each air filter sub-assembly comprising:
air filtration media;
a plurality of substantially planar air filter frame providing three-dimensional support for the air filtration media, the air filter frame having an opposed pair of first sides, an opposed pair of second sides, two opposed faces, a width between the opposed faces; and
an air filter frame-connecting means integrated into the air filter frame, the air filter frame-connecting means is selected from: integrated fold-over adhesive tabs located on one of the faces of the air-filter frame, integrated fold-over mechanical tabs located on at least one of the faces of the air-filter frame, integrated nesting connection devices located on at least one of the sides of the air-filter frame, integrated snap connectors located on at least one of the sides of the air-filter frame, integrated hook and loop fasteners located on at least one of the sides of the air-filter frame, integrated magnetic connectors located on at least one of the sides of the air-filter frame, or integrated slot-tab connectors located on at least one of the sides of the air-filter frame;
wherein the air filter frame-connecting means is adapted to connect a plurality of air filter sub-assemblies into an air filter assembly having sufficient structural strength in at least one direction so that the air filter sub-assemblies resists separation upon extraction of the air filter assembly from a filter track of a filter bank.

14. The air filter system of claim 13, wherein the air filter frame-connecting means is further adapted to form a pivotal connection between air filter sub-assemblies.

15. The disposable air filter sub-assembly of claim 14, wherein the air filter frame-connecting means is further adapted to form alternating pivotal connections.

16. The air filter system of claim 14, wherein the pivotal connection is configured so that an air-flow facing face of each air filter sub-assembly in an air filter assembly can be pivoted into a closed, face-to-face relationship upon extraction of the air filter assembly from the filter track of a filter bank.

17. The air filter system of claim 13, wherein the air filter frame-connecting means is selected from the group consisting of integrated nesting connection devices located on at least one of the sides of the air-filter frame, integrated snap connectors located on at least one of the sides of the air-filter frame, integrated hook and loop fasteners located on at least one of the sides of the air-filter frame, integrated magnetic connectors located on at least one of the sides of the air-filter frame, and integrated slot-tab connectors located on at least one of the sides of the air-filter frame.

18. The air filter system of claim 17, further comprising an expandable gap filling structure having dimensions generally the same as either the first opposed sides or the second opposed sides of an air filter frame; the expandable gap filling structure having a first end which faces away from the air filter assembly and a second end which comes into contact with a side of the air filter assembly, where the first end comprises the air filter frame-connecting means disposed along at least a portion of the first end of the expandable gap filling structure so that the air filter frame-connecting means of the gap filling structure are adapted to connect the expandable gap filling structure to a plurality of air filter sub-assemblies with sufficient structural strength in at least one direction so that the connection resists separation upon extraction of the air filter assembly from the filter track of the filter bank.

19. The air filter system of claim 18, wherein the expandable gap filling sub-assembly comprises a series of foam pieces having dimensions generally the same as either the first opposed sides or the second opposed sides of an air filter frame.

20. The air filter system of claim 13, wherein the air filter frame-connecting means is selected from the group consisting of integrated fold-over mechanical tabs located on at least one of the faces of the air-filter frame, integrated snap connectors located on at least one of the sides of the air-filter frame, integrated hook and loop fasteners located on at least one of the sides of the air-filter frame, integrated magnetic connectors located on at least one of the sides of the air-filter frame, or integrated slot-tab connectors located on at least one of the sides of the air-filter frame.

21. A disposable air filter sub-assembly comprising:
a first air filtration media;
a first substantially planar air filter frame providing three-dimensional support for the first air filtration media, the first air filter frame having an opposed pair of first sides, an opposed pair of second sides, two opposed faces, a width between the opposed faces;
a second air filtration media;
a second substantially planar air filter frame providing three-dimensional support for the second air filtration media, the second air filter frame having an opposed pair of first sides, an opposed pair of second sides, two opposed faces, a width between the opposed faces;

a hinge pivotally connecting the first air filter frame with the second air filter frame along a first side or second side of the respective filter frames and along the same opposed face of the first and second air filter frames; and an air filter frame-connecting means integrated into each air filter frame on either: (i) a remaining non-connected first side or second side of the respective filter frames that are generally parallel with the hinge; or (ii) on an opposed pair of first sides or the opposed pair of second sides that are generally perpendicular to the hinge; and wherein the air filter frame-connecting means is adapted to connect a plurality of air filter sub-assemblies into an air filter assembly having sufficient structural strength in at least one direction so that the air filter sub-assemblies resists separation upon extraction of the air filter assembly from a filter track of a filter bank.

22. The disposable air filter sub-assembly of claim 21 further comprising:

at least a third air filtration media;

at least a third substantially planar air filter frame providing three-dimensional support for the at least third air filtration media, the at least third air filter frame having an opposed pair of first sides, an opposed pair of second sides, two opposed faces, a width between the opposed faces; and a hinge pivotally connecting the second air filter frame with the at least third air filter frame along a first side or second side of the respective filter frames and along the same opposed face of the first and second air filter frames.

23. The disposable air filter sub-assembly filter of claim 21, wherein the air filter frame-connecting means is selected from: integrated fold-over adhesive tabs, integrated fold-over mechanical tabs, integrated nesting connection devices, integrated snap connectors, integrated hook and loop fasteners, integrated magnetic connectors, and integrated slot-tab connectors.

24. The disposable air filter sub-assembly of claim 23, wherein the air filter frame-connecting means is disposed along at least a portion of the opposed first sides.

25. The disposable air filter sub-assembly of claim 21, wherein the air filter frame-connecting means further comprises a frangible portion.

26. The disposable air filter sub-assembly of claim 21, further comprising an expandable gap filling structure having dimensions generally the same as either the first opposed sides or the second opposed sides of an air filter frame; the expandable gap filling structure having a first end which faces away from the air filter assembly and a second end which comes into contact with a side of the air filter assembly, where the first end comprises air filter frame-connecting means disposed along at least a portion of the first end of the expandable gap filling structure so that the air filter frame-connecting means of the gap filling structure are adapted to connect the expandable gap filling structure to a plurality of air filter sub-assemblies with sufficient structural strength in at least one direction so that the connection resists separation upon extraction of the air filter assembly from the filter track of the filter bank.

27. The disposable air filter sub-assembly of claim 26, wherein the expandable gap filling sub-assembly comprises a series of foam pieces having dimensions generally the same as either the first opposed sides or the second opposed sides of an air filter frame.

* * * * *